United States Patent
Takeda et al.

(10) Patent No.: US 9,312,703 B2
(45) Date of Patent: Apr. 12, 2016

(54) CHARGE CONTROL METHOD AND DISCHARGE CONTROL METHOD FOR ELECTRIC STORAGE APPARATUS

(71) Applicant: Yoshifumi Takeda, Osaka (JP)

(72) Inventors: Harumi Takeda, Osaka (JP); Yoshifumi Takeda, Osaka (JP)

(73) Assignee: Yoshifumi Takeda, Osaka (JP)

( * ) Notice: Subject to any disclaimer, the term of this patent is extended or adjusted under 35 U.S.C. 154(b) by 479 days.

(21) Appl. No.: 13/749,993

(22) Filed: Jan. 25, 2013

(65) Prior Publication Data

US 2013/0200860 A1 Aug. 8, 2013

Related U.S. Application Data

(63) Continuation of application No. PCT/JP2010/062606, filed on Jul. 27, 2010.

(51) Int. Cl.
*H02J 7/00* (2006.01)
*H01G 9/00* (2006.01)
*H01G 5/38* (2006.01)
*H02M 3/06* (2006.01)
*H02M 3/07* (2006.01)
*H02J 7/34* (2006.01)

(52) U.S. Cl.
CPC .............. *H02J 7/00* (2013.01); *H02J 7/0024* (2013.01); *H02J 7/34* (2013.01); *H02M 3/07* (2013.01); *H02J 7/0068* (2013.01)

(58) Field of Classification Search
CPC ........ H02J 7/0016; H02J 7/345; Y02E 60/13; Y02T 10/7022; H02M 3/33507; H02M 3/07; H02M 3/18; H03K 3/53; H03K 3/537; G01R 15/14; H01G 9/058; H01G 9/155; H01G 9/016; H01G 9/00; H01G 9/08; H01G 9/14; H01G 4/38; A61N 1/375
USPC ............ 320/166, 167; 361/502, 522; 307/109
See application file for complete search history.

(56) References Cited

U.S. PATENT DOCUMENTS

2001/0054877 A1* 12/2001 Kinoshita ............. H02J 7/0014
320/112
2009/0134851 A1* 5/2009 Takeda .................... H02M 3/07
323/234

FOREIGN PATENT DOCUMENTS

| JP | 11-215695 | 8/1999 |
|----|-----------|--------|
| JP | 2002-10501 | 1/2002 |
| JP | 2008-79364 | 4/2008 |
| WO | 2007/046138 | 4/2007 |

OTHER PUBLICATIONS

International Search Report issued Oct. 26, 2010 in International Application No. PCT/JP2010/062606.

* cited by examiner

*Primary Examiner* — Richard Isla Rodas
*Assistant Examiner* — Mohammed J Sharief
(74) *Attorney, Agent, or Firm* — Wenderoth, Lind & Ponack, L.L.P.

(57) ABSTRACT

According to the charge control method of the present invention, as an electric storage means, a group of capacitors is used that include 2n (where n is an integer of 2 or more) electric double layer capacitors, from first to 2n-th electric double layer capacitors, having an equal electrostatic capacity, and that is configured such that adjacent electric double layer capacitors are connected either in series or in parallel by a switch and the 2n-th electric double layer capacitor and the first electric double layer capacitor are connected in parallel by a switch. Among the 2n capacitors Ci constituting the electric storage unit 21, adjacent capacitors are sequentially switched from a series connection to a parallel connection, or the 2n-th capacitor C2n and the first capacitor C1 are switched to a parallel connection state, whereby variations in the inter-terminal voltages of the capacitors are suppressed.

5 Claims, 23 Drawing Sheets

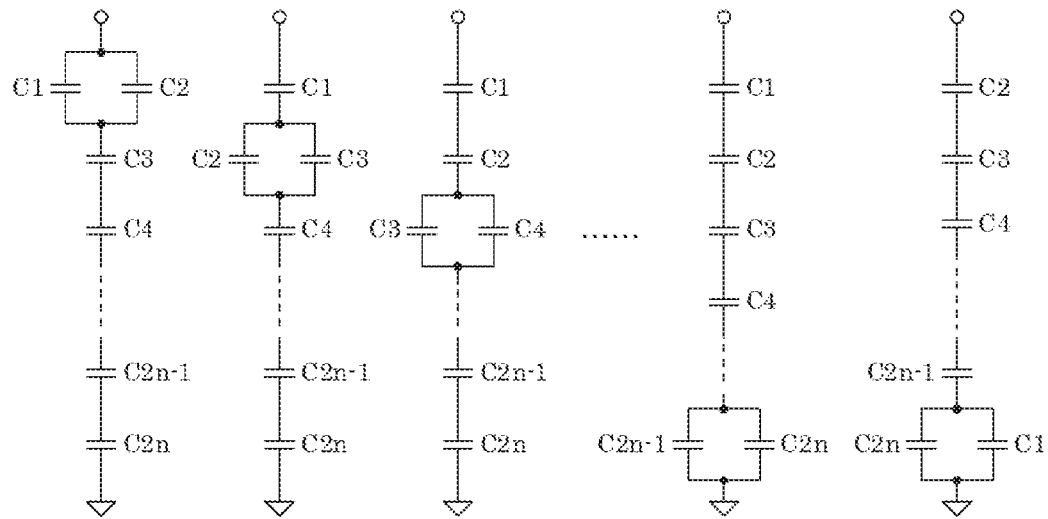
Fig. 6A   Fig. 6B   Fig. 6C   Fig. 6D   Fig. 6E
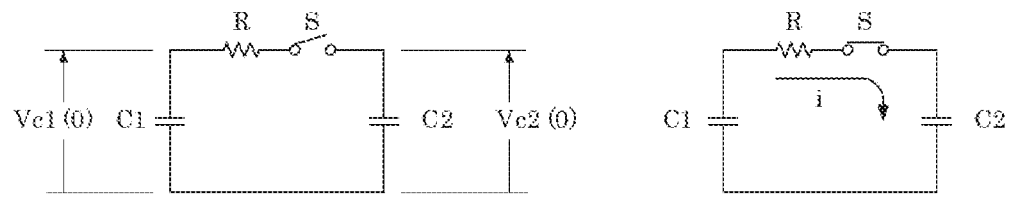
Fig. 7A              Fig. 7B
Fig. 8
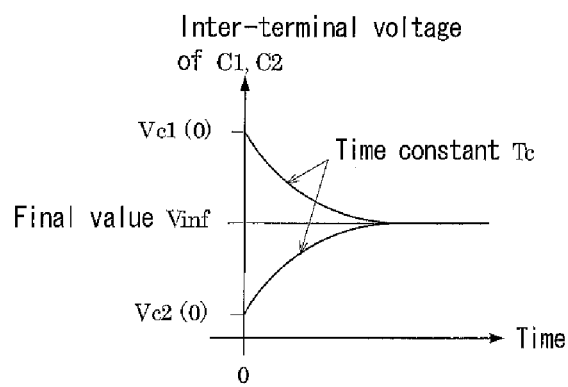

Pb=1　　　　　Pb=2　　　　　Pb=3　　　　　Pb=4　　　　　Pb=5

Pb=6　　　　　Pb=7　　　　　Pb=8　　　　　Pb=9　　　　　Pb=10

Pb=1　　　　Pb=2　　　　Pb=3　　　　Pb=4　　　　Pb=5

Pb=6　　　　Pb=7　　　　Pb=8　　　　Pb=9　　　　Pb=10

Pb=1          Pb=2

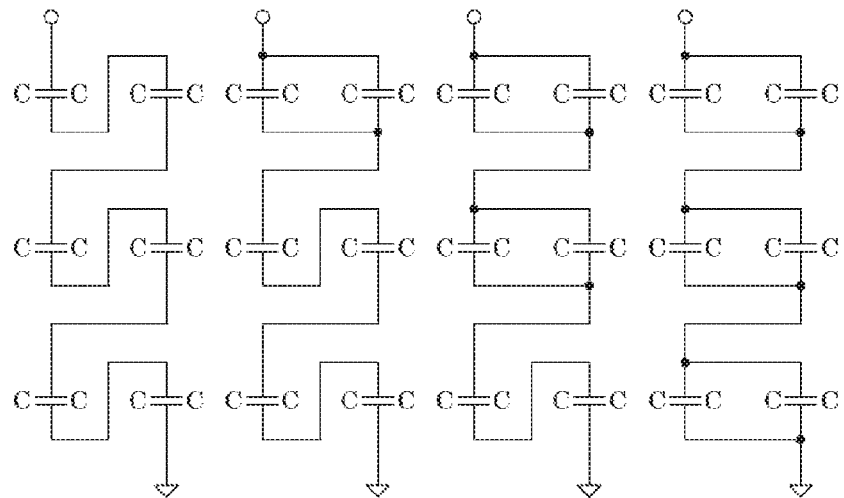
Fig. 26A   Fig. 26B   Fig. 26C   Fig. 26D
Fig. 27
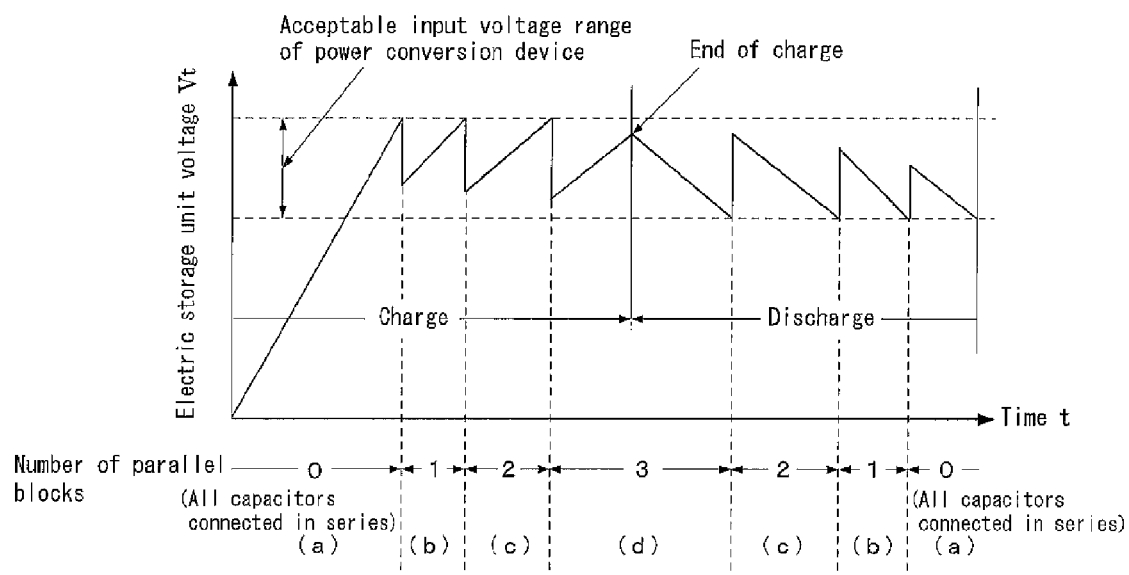

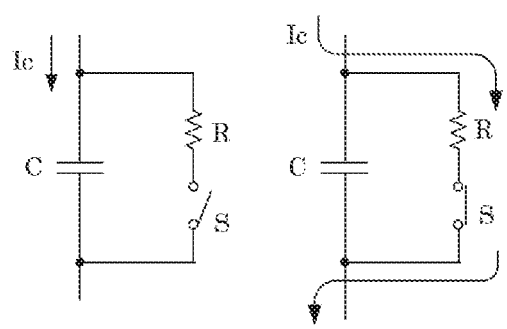
Fig. 28A    Fig. 28B
Fig. 29
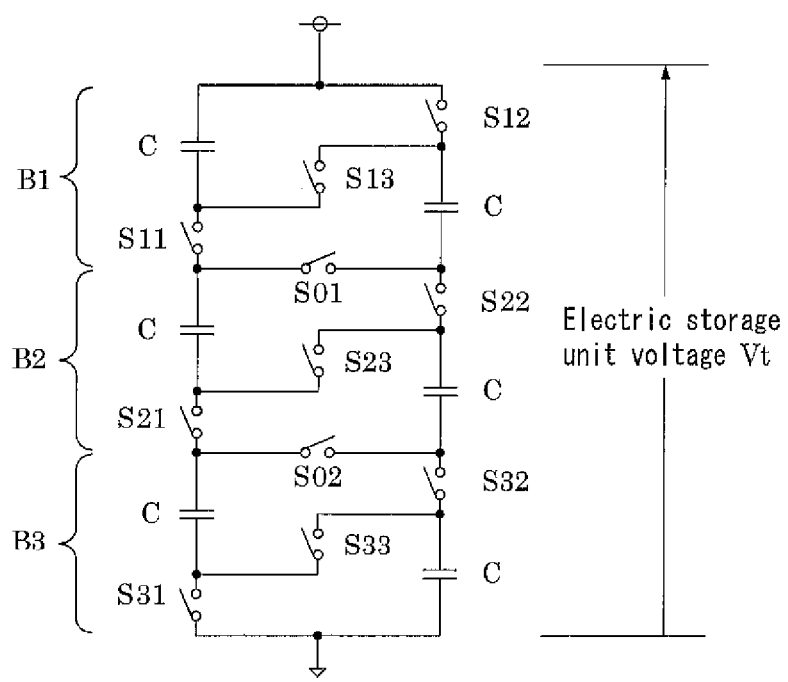

CHARGE CONTROL METHOD AND DISCHARGE CONTROL METHOD FOR ELECTRIC STORAGE APPARATUS

TECHNICAL FIELD

The present invention relates to a charge control method and a discharge control method for an electric storage apparatus in which electric double layer capacitors are used as an electric storage device.

BACKGROUND ART

Electric double layer capacitors, which have features of long cycle life and a wide working temperature range, are attracting attention as a new type of electric storage device that can replace secondary batteries.

A power supply system will be described in which electric double layer capacitors (hereinafter also referred to simply as "capacitors") are used as an electric storage device, with reference to FIG. 23.

Direct current power supplied from a direct current power source 1 such as a solar cell is temporarily stored in an electric storage unit 21 implemented with a plurality of capacitors in an electric storage apparatus 2. Unlike secondary batteries, with capacitors, the inter-terminal voltage varies significantly in proportion to the amount of accumulated charge, and thus the power stored in the electric storage unit 21 cannot be supplied directly to a load. For this reason, the power stored in the electric storage unit 21 is supplied to a power conversion device 3 such as a DC-DC converter or a DC-AC inverter to stabilize voltage, and thereafter supplied to a load 4.

In the case where the load 4 is driven with direct current power, a DC-DC converter or the like is used as the power conversion device 3. A control unit 22 controls charge and discharge of the electric storage unit 21.

In the power supply system shown in FIG. 23, the power conversion device 3 has an acceptable input voltage range. Accordingly, in order to continuously supply stable power to the load, it is necessary to maintain the output voltage of the electric storage unit 21 (hereinafter referred to as the "electric storage unit voltage") Vt within the acceptable input voltage range of the power conversion device 3.

Since a single capacitor has a low output voltage, the electric storage unit 21 is often implemented with a plurality of capacitors that are connected in series. It is also often the case that a plurality of capacitors are connected in parallel, in order to secure the required amount of accumulated charge. Accordingly, the electric storage unit 21 including capacitors in the electric storage apparatus 2 are usually configured such that a plurality of capacitors are connected in series and in parallel.

In order to improve charge/discharge characteristics and the depth of discharge, such a conventional electric storage apparatus 2, in which the electric storage unit 21 is implemented with a plurality of capacitors, uses a charge control method and discharge control method using a combination of two methods, namely, "series/parallel switching control" and "parallel monitor". Hereinafter, an electric storage apparatus 2 that uses the two methods disclosed in Patent Document 1 will be described with reference to the drawings.

First, series/parallel switching control will be described. Series/parallel switching control is a method for improving charge/discharge characteristics and the depth of discharge used in an electric storage apparatus 2 in which the electric storage unit 21 is implemented with a plurality of capacitors that are connected in series or in parallel.

The electric storage unit 21 of Patent Document 1 that uses series/parallel switching control is configured as shown in FIG. 24. Specifically, a single circuit block (hereinafter referred to simply as a "block") includes a pair of capacitors C, C having an equal electrostatic capacity, and a plurality of switches S that switch the pair of capacitors C, C between series connection and parallel connection, and blocks thus configured are connected in series in n stages (B1 to Bn).

Next, a series/parallel switching control method will be described, taking as an example a case where the electric storage unit 21 is configured with blocks (B1 to B3) in three stages as shown in FIG. 25. FIG. 26 is a diagram showing only the connection states of capacitors C obtained by omitting illustration of the switches of the electric storage unit 21 shown in FIG. 25.

In the case where charging is started from the state in which all capacitors C that constitute the electric storage unit 21 shown in FIG. 25 are in a fully discharged state, switches S12, S22 and S32 shown in FIG. 25 are first turned on (i.e., closed), and switches S11, S13, S21, S23, S31 and S33 are turned off (i.e., opened), whereby as shown in FIG. 26A, the capacitors C of all blocks are connected in series, and charging is started in this state.

As charging progresses, charges are stored in each capacitor C and the electric storage unit voltage Vt rises. Each time the electric storage unit voltage Vt reaches an upper limit value of the acceptable input voltage range of the power conversion device 3, the switches (S11 to S33) shown in FIG. 25 are turned on or off as appropriate, whereby charging is performed such that the capacitors C of each block are switched in sequence from a series connection to a parallel connection in a predetermined order, the order being, for example, FIG. 26B→FIG. 26C→FIG. 26D, until the capacitors C of all blocks are connected in parallel, so that the electric storage unit voltage Vt falls within the acceptable input voltage range of the power conversion device 3.

At the time of discharging, each time the electric storage unit voltage Vt reaches a lower limit value of the acceptable input voltage range of the power conversion device 3 as the electric storage unit voltage Vt declines, the switches (S11 to S13) shown in FIG. 25 are turned on or off as appropriate, whereby discharging is performed such that the capacitors C of each block are switched in sequence from a parallel connection to a series connection in a predetermined order that is the reverse of the order used at the time of charging, such as the order of FIG. 26D→FIG. 26C→FIG. 26B→FIG. 26A. As described above, the series/parallel switching control improves charge/discharge characteristics and the depth of discharge by maintaining the electric storage unit voltage Vt within the acceptable input voltage range of the power conversion device 3.

FIG. 27 is a schematic diagram showing a temporal transition of the electric storage unit voltage Vt during the charging process and discharging process described above. The symbols (a) to (d) shown in the bottom of FIG. 27 indicate time periods corresponding to the connection states of the capacitors C in the electric storage unit 21 shown in FIG. 26A to 26D.

Next, "parallel monitor" will be described. Generally, the electrostatic capacity of capacitors varies significantly from capacitor to capacitor. Accordingly, when a plurality of capacitors connected in series are charged, the capacitors become fully charged from those having a smaller electrostatic capacity. If charging is continued, the capacitors having a smaller electrostatic capacity are overcharged, causing a degradation, or in the worst case, a breakage.

To address this, in an electric storage apparatus in which capacitors are used in the electric storage device, it is often the case that a circuit called a "parallel monitor" implemented with a resistor R and a switch S as shown in FIG. 28A is provided between each pair of capacitors C. When the inter-terminal voltage of each capacitor C exceeds an upper rated voltage (an upper limit value of the inter-terminal voltage at which the capacitor can be used safely), the parallel monitor turns on the switch S as shown in FIG. 28B so as to forcibly bypass charge current Ic, thereby preventing overcharge of the capacitor C.

Next, problems encountered with the charge control method for an electric storage apparatus of Patent Document 1 will be described. Even if the electric storage unit is implemented with a plurality of capacitors having the same nominal electrostatic capacity, the series/parallel switching control reduces the amount of charge that flows into the capacitors C of the blocks that are connected in parallel to approximately half the amount of charge that flows into the capacitors C of the blocks that are connected in series. Furthermore, actual capacitors have electrostatic capacity errors and differences in self discharge characteristics, and thus the inter-terminal voltage varies from capacitor to capacitor.

Due to such variations, when any one of the capacitors C of the blocks connected in series reaches the upper rated voltage (i.e., been fully charged), in order to prevent overcharge, the capacitor C needs to, with the use of the parallel monitor, maintain the inter-terminal voltage at a level less than or equal to the upper rated voltage until the capacitors C of the other blocks connected in parallel are fully charged. As a result, heat loss occurs due to the resistance of the parallel monitor, reducing charge efficiency.

That is, with the conventional charge control method disclosed in Patent Document 1, there are very large variations in the inter-terminal voltage of the capacitors between the blocks, and the parallel monitor requires a long operation time to prevent overcharge, and thus heat loss increases and as a result charge efficiency is reduced.

In order to solve the above-described problems, the inventors have developed a series/parallel switching control method that suppresses variations in the inter-terminal voltage of all capacitors that constitute an electric storage unit (see Patent Document 2).

With the charge control method for an electric storage apparatus developed by the inventors, the parallel monitor is used not only to prevent overcharge, but also to perform correction (called "normal correction") such that the inter-terminal voltage of each capacitor is within a predetermined range by controlling the parallel monitor at a fixed interval, as well as to prevent so-called "cross current" that occurs when the capacitors of each block are switched from a series connection to a parallel connection. With a combined use of the charge control method for an electric storage apparatus with a series/parallel switching control method, which will be described later, it is possible to reduce the operation time of the parallel monitor and heat generated by the operation of the parallel monitor, as compared to those of the method of Patent Document 1, and charge efficiency can be enhanced.

The method for controlling series/parallel switching of blocks disclosed in Patent Document 2 will be described taking an example a case where the method is applied to an electric storage unit 21 implemented with three blocks (B1, B2, B3) shown in FIG. 29. FIG. 30 is a diagram showing, in a simplified form, the connection states of capacitors C obtained by omitting illustration of the switches of the electric storage unit shown in FIG. 29.

In a charging process, when all capacitors C are in a fully discharged state, switches S13, S01, S23, S02 and S33 are turned on, and switches S11, S12, S21, S22, S31 and S32 are turned off, whereby a state as shown in FIG. 30A in which all capacitors C are connected in series is obtained, and charging is started from that state.

Then, at the time when the electric storage unit voltage Vt reaches the upper limit value of the acceptable input voltage range of the power conversion device 3, the switches (S01 to S33) are controlled as appropriate, whereby the capacitors C of any one of the three blocks (B1 to B3) of the electric storage unit 21 are switched to a parallel connection, so as to reduce the electric storage unit voltage Vt to be within the acceptable input voltage range of the power conversion device 3.

At this time, a block having the highest sum (hereinafter referred to as the "block voltage") of the inter-terminal voltages of two capacitors C of a block is preferentially connected in parallel. Specifically, the connection state is switched from the state shown in FIG. 30A to one of the states shown in FIGS. 30B, 30C and 30D, and charging is continued.

Then, during the time until the electric storage unit voltage Vt again reaches the upper limit value of the acceptable input voltage range of the power conversion device 3, the inter-terminal voltages of all capacitors are measured at a fixed interval, a single block having the highest block voltage is selected, the capacitors of the block are connected in parallel, and the capacitors of the other blocks are connected back in series, and this operation is repeated. Specifically, an operation of switching, for example, the connection state from the state shown in FIG. 30B to one of the states shown in FIGS. 30C and 30D is repeated.

Furthermore, charging is continued, and when the electric storage unit voltage Vt again reaches the upper limit value of the acceptable input voltage range of the power conversion device 3, in order to reduce the electric storage unit voltage Vt to be within the acceptable input voltage range of the power conversion device 3, the number of blocks that are connected in parallel is increased to 2, and charging is continued. Specifically, the connection state is switched from one of the states shown in FIGS. 30B, 30C and 30D to one of the states shown in FIGS. 30E, 30F and 30G, and charging is continued. At this time as well, two blocks having the highest and second highest block voltages are selected, and the capacitors of the selected blocks are connected in parallel.

Then, during the time until the electric storage unit voltage Vt again reaches the upper limit value of the acceptable input voltage range of the power conversion device 3, the inter-terminal voltages of all capacitors are measured at a fixed interval, two blocks having the highest and second highest block voltages are selected, the capacitors of the selected blocks are connected in parallel, and the capacitors of the other blocks are connected in series. Specifically, an operation of switching, for example, the connection state from the state shown in FIG. 30E to the state shown in FIG. 30F or 30G is repeated.

When charging further progresses, and the electric storage unit voltage Vt again reaches the upper limit value of the acceptable input voltage range of the power conversion device 3, in order to reduce the electric storage unit voltage Vt to be within the acceptable input voltage range of the power conversion device 3, the connection state is switched to the state shown in FIG. 30H so that the number of blocks connected in parallel is three, and charging is continued until the inter-terminal voltage of any one of the capacitors reaches the rated voltage.

The electric storage unit voltage Vt is set so as to be within the acceptable input voltage range of the power conversion device 3 when the capacitors C of all blocks (B1 to B3) are connected in parallel as shown in FIG. 30H and all of the capacitors C are substantially fully charged.

On the other hand, in a discharging process, when all capacitors C are in a fully charged state, discharging is started from the state shown in FIG. 30H (the state in which all blocks are connected in parallel), and when the electric storage unit voltage Vt is reduced to the lower limit value of the acceptable input voltage range of the power conversion device 3, the capacitors C of any one of the blocks are switched to a series connection. This increases the electric storage unit voltage Vt, and discharging is maintained such that the electric storage unit voltage Vt is within the acceptable input voltage range of the power conversion device 3. At this time, blocks having higher block voltages are preferentially connected in series in sequence. Specifically, the connection state is switched from the state shown in FIG. 30H to one of the states shown in FIGS. 30E, 30F and 30G, and discharging is continued.

Then, discharging further progresses, and during the time until the electric storage unit voltage Vt again reaches the lower limit value of the acceptable input voltage range of the power conversion device 3, an operation of measuring the inter-terminal voltages of all capacitors at a fixed interval, selecting a single block having the highest block voltage, connecting the capacitors of the selected block in series, and connecting the capacitors of the other blocks in parallel is repeated, and discharging is continued. Specifically, the operation of switching the connection state from, for example, the state shown in FIG. 30E to the state shown in FIG. 30F or 30G is repeated, and discharging is continued.

When discharging further progresses, and the electric storage unit voltage Vt again reaches the lower limit value of the acceptable input voltage range of the power conversion device 3, in order to increase the electric storage unit voltage Vt to be within the acceptable input voltage range of the power conversion device 3, the number of blocks that are connected in series is increased to 2, and discharging is continued. Specifically, the connection state is switched from one of the states shown in FIG. 30E, 30F and 30G to one of the states shown in FIG. 30B, 30C and 30D, and charging is continued. At this time as well, two blocks having the highest and second highest block voltages are selected, and the capacitors of the selected blocks are connected in series, and discharging is continued.

Then, discharging further progresses, and during the time until the electric storage unit voltage Vt again reaches the lower limit value of the acceptable input voltage range of the power conversion device 3, an operation of measuring the inter-terminal voltages of all capacitors at a fixed interval, selecting two blocks having the highest and second highest block voltages, connecting the capacitors of the selected blocks in series, and connecting the capacitors of the other blocks in parallel is repeated, and discharging is continued. Specifically, the operation of switching the connection state from, for example, the state shown in FIG. 30B to the state shown in FIG. 30C or 30D is repeated, and discharging is continued.

When discharging further progresses, and the electric storage unit voltage Vt again reaches the lower limit value of the acceptable input voltage range of the power conversion device 3, in order to increase the electric storage unit voltage Vt to be within the acceptable input voltage range of the power conversion device 3, the connection state is switched to the state shown in FIG. 30A in which all capacitors are connected in series, and discharging is continued.

In the manner described above, discharging is performed such that the electric storage unit voltage Vt is maintained within the acceptable input voltage range of the power conversion device 3 by switching the connection state of the blocks between series connection and parallel connection.

As described above, a feature of the series/parallel switching control method of Patent Document 2 is that, unlike the method of Patent Document 1, the order of the blocks that undergo series/parallel switching and the pattern of series/parallel switching are not fixed, and series/parallel switching is performed such that variations in the inter-terminal voltage of the capacitors are suppressed at a fixed interval. By doing so, the inter-terminal voltage of the capacitors C of the blocks can be finely controlled, and furthermore, variations in the inter-terminal voltage of all capacitors C that constitute the electric storage unit 21 can be suppressed.

CITATION LIST

Patent Document

Patent Document 1: JP H11-215695
Patent Document 2: WO 2007/046138

DISCLOSURE OF INVENTION

Problem to be Solved by the Invention

As described above, the conventional charge control method and discharge control method for an electric storage apparatus allow realization of efficient charging and discharging by a combined use of series/parallel switching control and a parallel monitor. However, in the control method of Patent Document 1, the order of the blocks that undergo series/parallel switching and the pattern of series/parallel switching are fixed, and thus it is difficult to suppress variations in the inter-terminal voltage of the capacitors without using a parallel monitor.

Likewise, in the control method of Patent Document 2 as well, in the case where a plurality of blocks are connected in parallel, and the parallelized blocks are arranged so as to be adjacent to each other as shown in FIGS. 30E, 30G and 30-H, the capacitors in the parallelized blocks are connected in series, and thus the inter-terminal voltage varies from capacitor to capacitor. Particularly in the case of FIG. 30H in which the capacitors in all blocks are parallelized at the end of charging process, it is not possible to perform series/parallel switching, and thus variations in the inter-terminal voltages of the respective capacitors cannot be suppressed. Moreover, charging is stopped if the inter-terminal voltage of any one of the capacitors that constitute the electric storage unit reaches the rated voltage (i.e., fully charged state), and thus a reduction in charge efficiency is unavoidable.

Furthermore, with the series/parallel switching control method of Patent Document 2, the parallel monitor is used not only to prevent overcharge, but also to perform an operation called "normal correction" in which the inter-terminal voltage of each capacitor is corrected so as to be within a predetermined range by controlling the parallel monitor at a fixed interval, but heat generation due to the operation of the parallel monitor is inevitable, which is an obstacle to improving charge/discharge efficiency. As described above, with the conventional methods for controlling an electric storage apparatus, it is difficult to completely eliminate the parallel monitor, and power loss due to the parallel monitor cannot be avoided.

The present invention has been conceived in view of the problems encountered with conventional technology, and it is an object of the present invention to provide a charge control method and a discharge control method for an electric storage apparatus that can suppress variations in the inter-terminal voltage of capacitors during charging/discharging process, without using a parallel monitor.

Means for Solving Problem

In order to achieve the above object, a charge control method for an electric storage apparatus according to the present invention is a charge control method for an electric storage apparatus that uses, as an electric storage means, a group of capacitors that include 2n (where n is an integer of 2 or more) electric double layer capacitors, from first to 2n-th electric double layer capacitors, having an equal electrostatic capacity, and that is configured such that adjacent electric double layer capacitors can be connected either in series or in parallel by a switch and the 2n-th electric double layer capacitor and the first electric double layer capacitor can be connected in parallel by a switch, wherein where two electric double layer capacitors connected in parallel are defined as a parallel section, charging is started from a state in which all of the electric double layer capacitors are connected in series, and the following first processing (1) and second processing (2) are repeated until the number P of parallel sections reaches n, and an inter-terminal voltage of at least one of the 2n electric double layer capacitors reaches an upper rated voltage, first processing (1) when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other electric double layer capacitors are caused to be in a series connection state, where when K is an integer, a (2n+K)th electric double layer capacitor is a Kth electric double layer capacitor, and second processing (2) when a voltage of the electric storage means reaches a preset first voltage value, the number P of parallel sections is increased by one.

In the charge control method of the present invention, it is preferable that as the first voltage value, an upper limit value of an acceptable input voltage range of a power conversion device connected to an output side of the electric storage means is used.

A discharge control method for an electric storage apparatus according to the present invention is a discharge control method for an electric storage apparatus that uses, as an electric storage means, a group of capacitors that include 2n (where n is an integer of 2 or more) electric double layer capacitors, from first to 2n-th electric double layer capacitors, having an equal electrostatic capacity, and that is configured such that adjacent electric double layer capacitors can be connected either in series or in parallel by a switch and the 2n-th electric double layer capacitor and the first electric double layer capacitor can be connected in parallel by a switch, wherein where two electric double layer capacitors connected in parallel are defined as a parallel section, the following first processing (1) and second processing (2) are repeated until the state is changed from a state in which the number P of parallel sections is n to a state in which all of the electric double layer capacitors are connected in series, and a voltage of the electric storage means reaches a preset second voltage value, first processing (1) when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other electric double layer capacitors are caused to be in a series connection state, where when K is an integer, a (2n+K)th electric double layer capacitor is a Kth electric double layer capacitor, and second processing (2) when the voltage of the electric storage means reaches the second voltage value, the number P of parallel sections is decreased by one.

In the discharge control method of the present invention, it is preferable that as the second voltage value, a lower limit value of an acceptable input voltage range of a power conversion device connected to an output side of the electric storage means is used.

Also, it is preferable that in the case where capacitors in which a lower rated voltage has been set are used as the electric double layer capacitors, discharging is stopped when an inter-terminal voltage of any one of the electric double layer capacitors constituting the electric storage means falls below the lower rated voltage.

Effects of the Invention

With a charge control method and a discharge control method for an electric storage apparatus according to the present invention, among the capacitors constituting an electric storage unit, pairs of adjacent capacitors are sequentially connected in parallel, whereby the inter-terminal voltages of the capacitors are equalized, and as a result, variations in the inter-terminal voltages of the capacitors can be suppressed. This eliminates the need for a parallel monitor for preventing overcharge at the time of charging, whereby heat loss does not occur and thus charge efficiency improves. Also, at the time of discharging, the discharge time can be increased.

BRIEF DESCRIPTION OF DRAWINGS

FIG. 6A, FIG. 6B, FIG. 6C, FIG. 6D and FIG. 6E illustrate voltage equalization performed by shifting a parallel section.

FIG. 7A and FIG. 7B illustrate parallel connection time ΔT.

FIG. 8 is a diagram showing temporal changes in the inter-terminal voltages of the capacitors shown in FIG. 7A and FIG. 7B.

FIG. 26A, FIG. 26B, FIG. 26C and FIG. 26D show, in a simplified form, connection states of capacitors constituting the electric storage unit shown in FIG. 25.

FIG. 27 is a graph showing temporal changes in electric storage unit voltage in the case where discharge control is performed after charge control has been performed by a method disclosed in Patent Document 1.

FIG. 28A and FIG. 28B are circuit diagrams illustrating a "parallel monitor".

FIG. 29 is a circuit diagram showing an example of a configuration of an electric storage unit disclosed in Patent Document 2.

DESCRIPTION OF THE INVENTION

Hereinafter, a charge control method and a discharge control method for an electric storage apparatus (hereinafter referred to simply as a "charge control method" and a "discharge control method") according to an embodiment of the present invention will be described with reference to the drawings.

(Embodiment 1)

Figure 1:
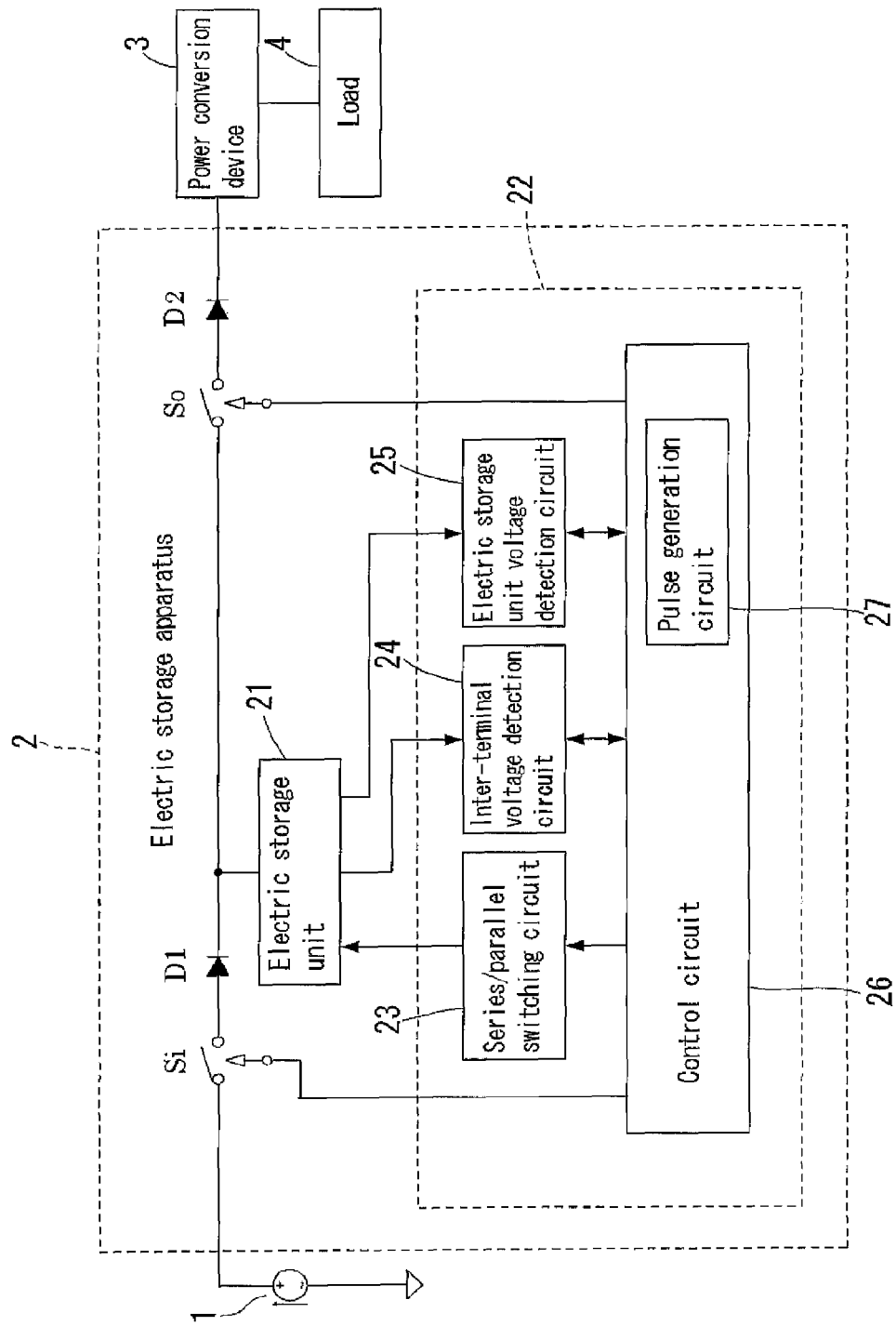
FIG. 1 is a block diagram showing a configuration of a power supply system including an electric storage apparatus.

FIG. 1 shows a configuration of a power supply system including an electric storage apparatus. In the present embodiment, a charge control method carried out by an electric storage apparatus 2 shown in FIG. 1 will now be described. The electric storage apparatus 2 stores direct current power supplied from a direct current power source 1, and the direct current power is converted to alternating current power by a power conversion device 3 and thereafter supplied to a load 4, or the direct current power is directly supplied to the load 4.

It is desirable that the direct current power source 1 is a current source. As the direct current power source 1, for example, a solar cell or the like can be used. It is also possible to use other power supply sources such as a wind power generator and an engine power generator. Such power supply sources, however, include alternating current power supply sources and direct current power supply sources, and thus if an alternating current power source is used as the power supply source, the current is converted to direct current before use.

The power conversion device 3 can be a DC-AC inverter or the like, and coverts the direct current power stored in the electric storage apparatus 2 to alternating current power and at the same time stabilizes output voltage. In the case where the load 4 is driven by direct current power, a DC-DC converter or the like is used as the power conversion device 3.

<Configuration of Electric Storage Apparatus>

A configuration of the electric storage apparatus will be described next. The electric storage apparatus 2 includes an electric storage unit 21 and a control unit 22. The electric storage unit 21 stores the direct current power supplied from the direct current power source 1. The control unit 22 controls charging and discharging of the electric storage unit 21.

Figure 2:
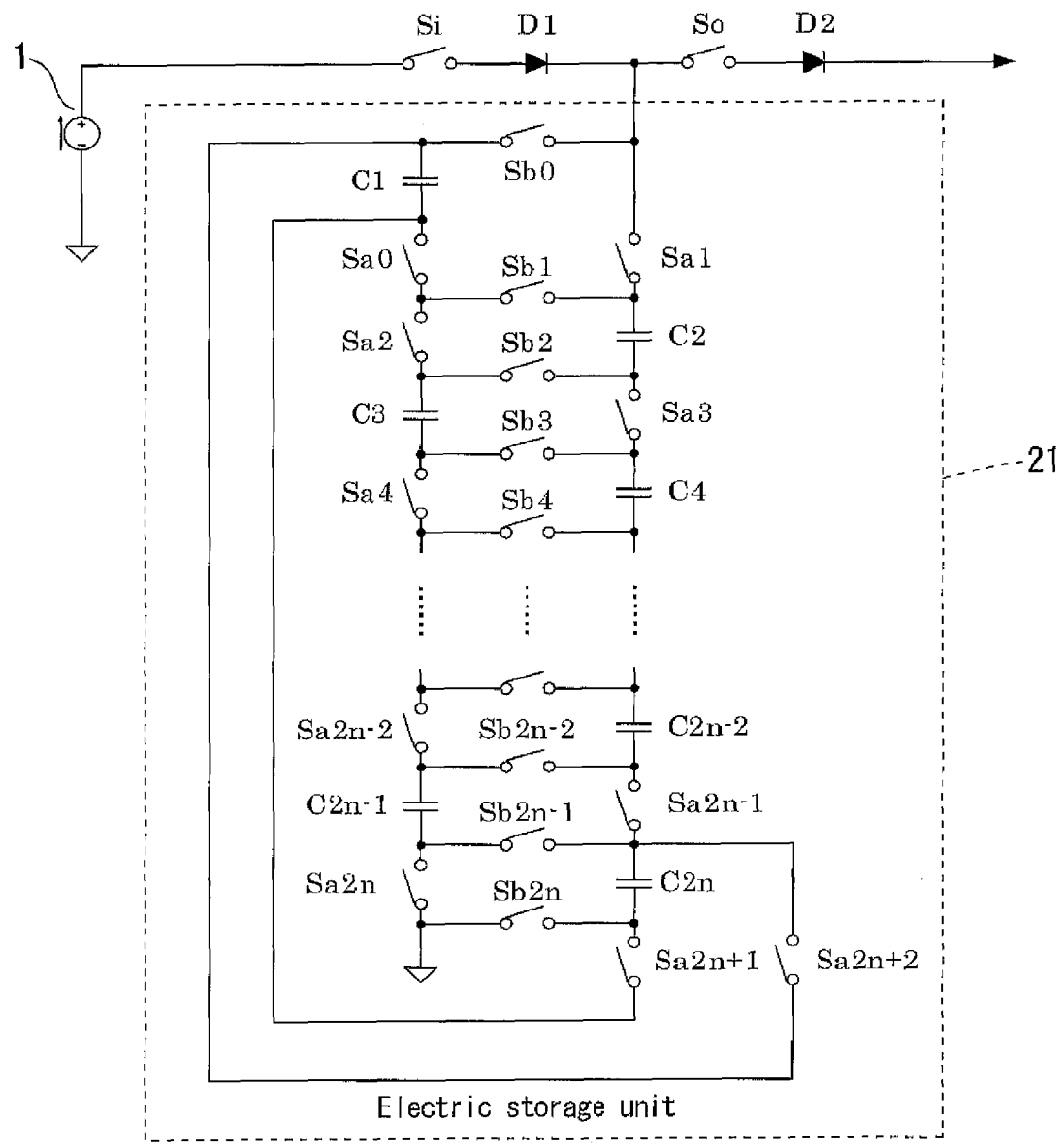
FIG. 2 is a circuit diagram showing an example of a configuration of an electric storage unit shown in FIG. 1.

FIG. 2 shows an example of a configuration of the electric storage unit 21. The electric storage unit 21 that is an electric storage means includes 2n (where n is an integer of 2 or more) capacitors Ci (i=1, 2, . . . , 2n) having an equal electrostatic capacity. Adjacent capacitors in the electric storage unit 21 are configured so as to be capable of being connected either in series or in parallel by switches Sa0, Sa1, . . . , Sa2n−1, Sa2n, Sb0, Sb1, . . . , Sb2n. The capacitor C2n, which is the 2n-th capacitor, and the capacitor C1, which is the first capacitor, are configured so as to be capable of being connected in parallel by the switches Sa2n+1 and Sa2n+2. Hereinafter, the switches Sa0, Sa1, . . . , Sa2n−1, Sa2n, Sb0, Sb1, . . . , Sb2n, Sa2n+1, Sa2n+2 are also collectively referred to as switches S. The switching operation of the switches S will be described later in detail with reference to the drawings.

As described above, electric double layer capacitors are used as the capacitors Ci. As used herein, electric double layer capacitors mean, in a narrow sense, symmetric electric double layer capacitors in which both positive and negative electrodes use an electric double layer capacitance, and in a wide sense include in addition to symmetric capacitors, asymmetric electric double layer capacitors in which one of the electrodes has an oxidation-reduction pseudo-capacitance (redox pseudo-capacitance) generated by oxidation and reduction reactions and the other electrode has an electric double layer capacitance, and the like. The present invention is applicable to such broadly defined electric double layer capacitors.

As the switches S, semiconductor switches implemented with FETs or the like are usually used. However, in the case where the amount of current flowing through the switches S is large, thyristors, IGBTs or the like may be used.

Reverting to FIG. 1, the control unit 22 controls charging and discharging of the electric storage unit 21, and includes a series/parallel switching circuit 23, an inter-terminal voltage detection circuit 24, an electric storage unit voltage detection circuit 25, and a control circuit 26.

The series/parallel switching circuit 23 switches each of the switches S of the electric storage unit 21 so as to switch adjacent capacitors either to a series connection state or a parallel connection state, and switches the 2n-th capacitor C2n and the first capacitor C1 to a parallel connection state.

The inter-terminal voltage detection circuit 24 detects inter-terminal voltage $Vci$ of each capacitor Ci constituting the electric storage unit 21. The electric storage unit voltage detection circuit 25 detects electric storage unit voltage $Vt$ that is an output voltage of the electric storage unit 21. The inter-terminal voltage $Vci$ of each capacitor Ci detected by the inter-terminal voltage detection circuit 24 and the electric storage unit voltage $Vt$ detected by the electric storage unit voltage detection circuit 25 are input into the control circuit 26.

The control circuit 26 controls the series/parallel switching circuit 23 based on the inter-terminal voltage $Vci$ of each capacitor Ci output from the inter-terminal voltage detection circuit 24 and the electric storage unit voltage $Vt$ output from the electric storage unit voltage detection circuit 25. The control circuit 26 also controls a switch Si for charge and a switch So for discharge in FIG. 2 to be on or off.

The control circuit 26 includes a pulse generation circuit 27. The pulse generation circuit 27 generates pulses from a clock signal at a time interval, which will be described later, and outputs the pulses to the series/parallel switching circuit 23, the inter-terminal voltage detection circuit 24, and the electric storage unit voltage detection circuit 25 as a timing signal.

In the case where the control circuit 26 is implemented with a micro controller including a CPU (Central Processing Unit), or the like, the respective functions of the control circuit 26 and the pulse generation circuit 27 are performed by the CPU reading software (program) stored in a ROM (Read Only Memory) and executing the software.

In the diagram, the switch Si is a switch for charge. When the switch Si is closed in response to an instruction from the control circuit 26, the direct current power source 1 and the electric storage unit 21 are connected via a diode D1. Likewise, the switch So is a switch for discharge. When the switch So is closed in response to an instruction from the control circuit 26, the electric storage unit 21 and the load 4 are connected via a diode D2 and the power conversion device 3. The diodes D1 and D2 are diodes for preventing current from flowing in reverse.

Power for operation is supplied to the respective circuits of the control unit 22 and the power conversion device 3 from a power source (not shown) such as an accumulator. However, it is also possible to use a part of the direct current power stored in the electric storage unit 21 as the power for operation, without providing a power source. In this case, the control circuit 26 needs to control discharge such that the amount of power stored in the electric storage unit 21 does not fall below the amount of power required by the control circuit 26.

<Control for Switching Connection State of Capacitors>

Next, control for switching the connection state of capacitors Ci according to the present invention will be described.

The present invention uses a method (hereinafter, referred to as "voltage equalization") in which in an electric storage apparatus 2 including a series/parallel switching control type electric storage unit 21, among 2n capacitors Ci (i=1, 2, . . . , 2n) constituting the electric storage unit 21, pairs of adjacent capacitors are sequentially switched from a series connection to a parallel connection, or the 2n-th capacitor C2n and the first capacitor C1 are switched to a parallel connection state, so as to suppress variations in the inter-terminal voltage of the capacitors.

Specifically, a feature of the charge control method according to the present invention is that if a unit in which two adjacent capacitors Ci (i=1, 2, . . . , 2n) or the 2n-th capacitor C2n and the first capacitor C1 are connected in parallel is denoted by a parallel section, charging is started from a state in which all capacitors constituting the electric storage unit are connected in series (i.e., a state in which the number P of parallel sections is 0), and the following first processing (1) and second processing (2) are repeated until the number P of parallel sections varies from 1 to n and the inter-terminal voltage of either one of 2n capacitors reaches an upper rated voltage.

First processing (1), when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other capacitors are caused to be in a series connection state, where when K is an integer, a (2n+K)th capacitor is a Kth capacitor.

Second processing (2), when the voltage of the electric storage unit 21 that is an electric storage means reaches a preset first voltage value, the number P of parallel sections is increased by one.

Figure 3A:
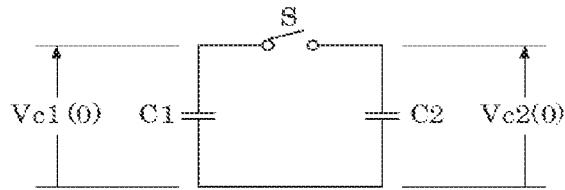
FIG. 3A and FIG. 3B illustrate the principle of voltage equalization by parallel connection.

Hereinafter, the first processing and the second processing will be described in detail. First, the first processing will be described. It is assumed that, as shown in FIG. 3A, two capacitors C1 and C2 are connected via a switch S, and the inter-terminal voltages of the capacitors C1 and C2 at time 0 are respectively represented by $Vc1(0)$ and $Vc2(0)$ and satisfy $Vc1(0) > Vc2(0)$.

Figure 3B:
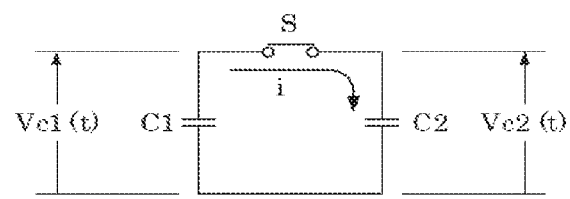

As shown in FIG. 3B, when the switch S is closed at time 0 so as to connect the two capacitors C1 and C2 in parallel, then, charges move from the capacitor C1 having a high inter-terminal voltage to the capacitor C2 having a low inter-terminal voltage (i.e., the current i flows from the capacitor C1 to the capacitor C2). After a sufficient amount of time has passed, the inter-terminal voltages of the two capacitors C1 and C2 become equal. The present invention actively utilizes the fact that by connecting two capacitors in parallel in a manner as described above, the inter-terminal voltages of the capacitors are equalized.

Figure 4:
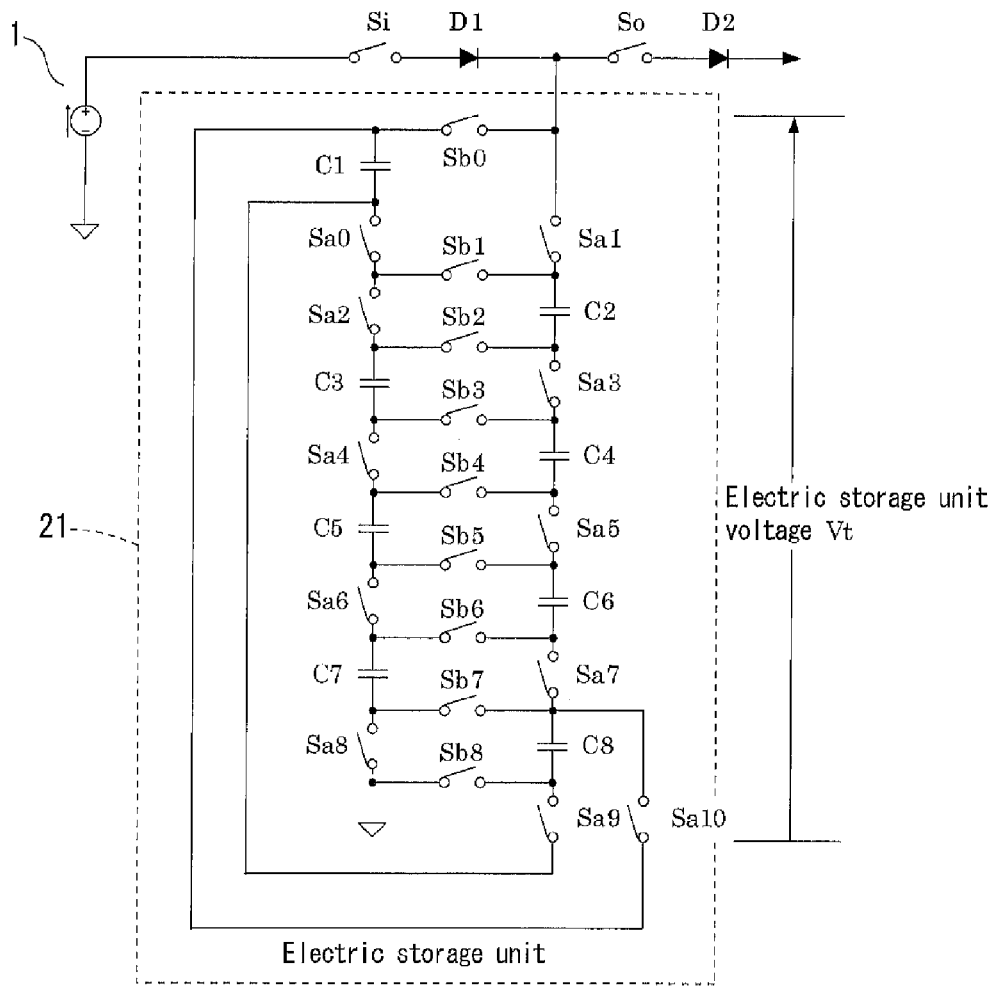
FIG. 4 is a circuit diagram in the case of n=4 in the circuit diagram of FIG. 2.

Hereinafter, control for switching the connection state of capacitors Ci in the electric storage unit 21 will be described in detail with reference to FIGS. 4 and 5. FIG. 4 shows the case of n=4 in FIG. 2. Likewise, FIG. 5 is a diagram showing only connection states of capacitors Ci in the electric storage unit 21 obtained by omitting illustration of the switches S shown in FIG. 4. Note that FIGS. 5B to 5G show cases where only one pair of capacitors are connected in parallel (i.e., the number P of parallel sections is 1).

Figure 5A:
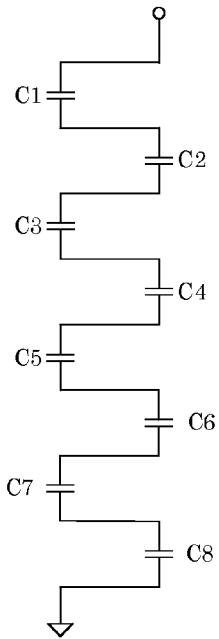
FIG. 5A, FIG. 5B, FIG. 5C, FIG. 5D, FIG. 5E, FIG. 5F and FIG. 5G show, in a simplified form, connection states of capacitors in the electric storage unit shown in FIG. 4.
Figure 5B:
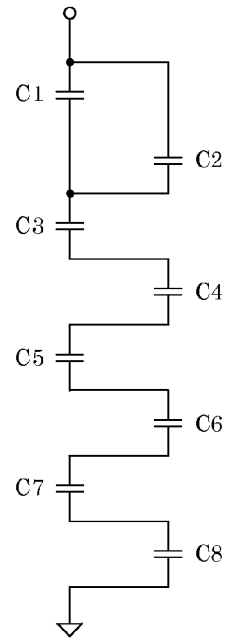

In FIG. 4, when the switches Sa1 to Sa10 are opened and the switches Sa0 and Sb0 to Sb8 are closed, then, as shown in FIG. 5A, all capacitors are connected in series. When the switches Sa3 to Sa10 and Sb1 shown in FIG. 4 are opened and the switches Sb0, Sa0 to Sa2 and Sb2 to Sb8 are closed, then, as shown in FIG. 5B, the capacitors C1 and C2 are connected in parallel.

Figure 5C:
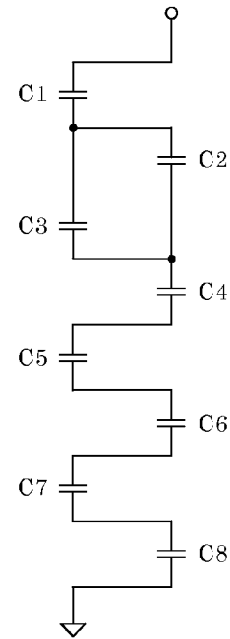
Figure 5D:
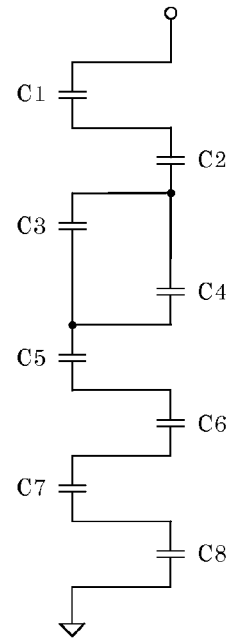
Figure 5E:
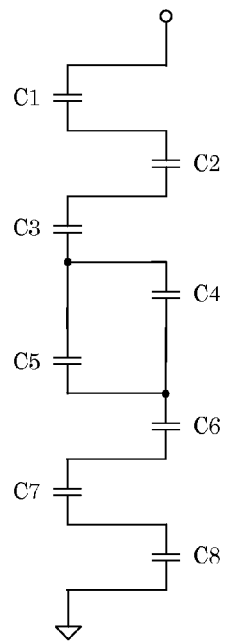
Figure 5F:
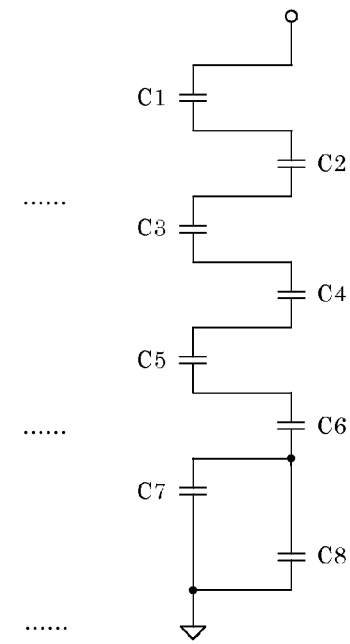
Figure 5G:
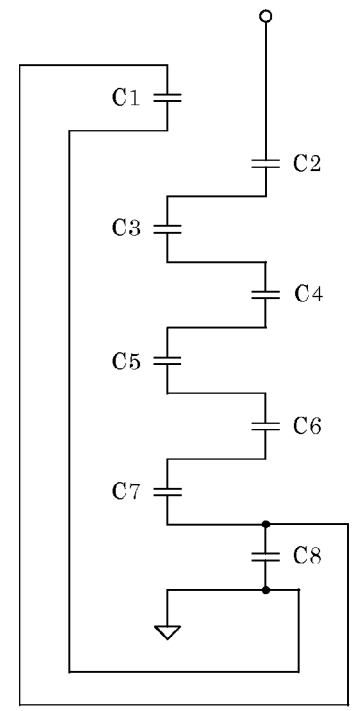

Similarly, when the switches Sa0 to Sa10 and the switches Sb0 to Sb8 are turned on (i.e., closed) or off (i.e., opened) as appropriate, two adjacent capacitors such as C2 and C3, C3 and C4, . . . , C7 and C8 can be sequentially switched from a series connection to a parallel connection, and the capacitors C8 and C1 can be connected in parallel. FIG. 5C shows a state in which the capacitors C2 and C3 are connected in parallel, FIG. 5D shows a state in which the capacitors C3 and C4 are connected in parallel, FIG. 5E shows a state in which the capacitors C4 and C5 are connected in parallel, FIG. 5F shows a state in which the capacitors C7 and C8 are connected in parallel, and FIG. 5G shows a state in which the capacitors C8 and C1 are connected in parallel.

The original purpose of series/parallel switching control of the capacitors constituting the electric storage unit 21 is to maintain the electric storage unit voltage Vt within the acceptable input voltage range of the power conversion device 3. Accordingly, the number of states (parallel sections) in which two capacitors are connected in parallel is the most important factor, and thus any two capacitors may be parallelized as long as the number P of parallel sections is a value allowing the electric storage unit voltage Vt to be within the acceptable input voltage range of the power conversion device 3.

Accordingly, in the present embodiment, voltage equalization is performed by sequentially shifting the parallel sections while maintaining the number P of parallel sections required to maintain the electric storage unit voltage Vt within the acceptable input voltage range of the power conversion device 3. Specifically, as shown in FIG. 6, the capacitors that are adjacent via switches S, and the 2n-th capacitor C2n and the first capacitor C1 are sequentially connected in parallel so as to transfer charges between each other, whereby the inter-terminal voltages of the capacitors are equalized.

As shown in FIG. 2, in the case where the electric storage unit 21 is implemented with 2n capacitors, and the number of parallel sections is 1, as shown in FIG. 6A, first, the capacitors C1 and C2 are connected in parallel during $\Delta T$ [sec]. At this time, if there is a difference in the inter-terminal voltage between the capacitors C1 and C2, charges start moving and the difference in the inter-terminal voltage between the capacitors C1 and C2 is reduced.

When after $\Delta T$ [sec], the capacitors C2 and C3 are connected in parallel as shown in FIG. 6B, the inter-terminal voltages of the capacitors C2 and C3 are equalized. After that, the same operation is repeated every $\Delta T$ [sec], after a while, the capacitors C2n−1 and C2n are connected in parallel, and finally the capacitors C2n and C1 are connected in parallel, whereby one cycle ends. When the series of operations from FIG. 6A to FIG. 6E ends, the above-described series of operations are repeated again from the state of FIG. 6A. Hereinafter, the constant time $\Delta T$ during which a pair of capacitors are connected in parallel will be referred to as the "parallel connection time".

Accordingly, as shown in FIG. 4, in the case where the electric storage unit is implemented with eight capacitors, and the number P of parallel sections is 1, charging is performed while voltage equalization is performed by sequentially connecting adjacent capacitors and the capacitors C8 and C1 in parallel every $\Delta T$ [sec] from the state shown in FIG. 5B, in which the capacitors C1 and C2 are connected in parallel, in the following order: FIG. 5B→FIG. 5C→FIG. 5D→FIG. 5E→ . . . FIG. 5F→FIG. 5G→FIG. 5B→FIG. 5C→FIG. 5D→ . . . . Hereinafter, such a voltage equalization method of capacitors will be referred to as "voltage equalization by parallelization of adjacent capacitors".

As described above, by sequentially connecting the capacitors in parallel while performing switching control of the parallel sections every parallel connection time $\Delta T$ [sec], even if there is a variation in the inter-terminal voltage between capacitors, charges are transferred from the capacitor having a large inter-terminal voltage to the capacitor having a small inter-terminal voltage. Therefore, if an appropriate parallel connection time $\Delta T$ is selected, the inter-terminal voltages of all capacitors constituting the electric storage unit 21 are constantly maintained as substantially equal.

Moreover, the switching control described above only requires a repetition of the switching operation of the switches every parallel connection time $\Delta T$ [sec] and does not require complex computations, as a result of which the configuration of the control unit 22 can be simplified.

Next is a description of the parallel connection time $\Delta T$ required for voltage equalization of capacitors in the case where the electric storage unit 21 is implemented with 2n capacitors. If it is assumed that the parallel connection time of the capacitors Ci and Ci+1 (i=1, 2, . . . , 2n, hereinafter, it is assumed that the value of i cycles from 1 to 2n and that C2n+1 is C1) is $\Delta T$ [sec](constant), the time Tp [sec] required to sequentially connect in parallel the capacitors C1 and C2, the capacitors C2 and C3, the capacitors C3 and C4, . . . , the capacitors C2n−1 and C2n, and the capacitors C2n and C1, starting from the capacitors C1 and C2 is represented by the following equation:

[Expression 1]

$$Tp = \Delta T \times 2n \text{[sec]} \qquad (1).$$

The time Tp [sec] is defined as "the time for one cycle".

Here, a case will be considered in which two capacitors C1 and C2 in which a difference has occurred in the inter-terminal voltage for some reason are connected in parallel via a switch S as shown in FIG. 7A. In FIG. 7, the resistance within the parallel circuit such as the internal resistance of the switch and the capacitors is indicated by R [Ω].

First, the nominal electrostatic capacities of two capacitors C1 and C2 are denoted by C [F], and the actual electrostatic capacity of the capacitor C1 is denoted by aC [F], and the actual electrostatic capacity of the capacitor C2 is denoted by bC [F]. Also, it is assumed that the switch S is closed at time 0, the inter-terminal voltage of the capacitor C1 immediately before the switch S is closed (time 0) is denoted by Vc1(0) [V], and the inter-terminal voltage of the capacitor C2 immediately before the switch S is closed is denoted by Vc2(0) [V]. The following description will be given by omitting the unit of voltage [V].

FIG. 8 shows temporal changes in the inter-terminal voltages of the capacitors C1 and C2. As a result of the switch S being closed at time 0, for example, in the case of Vc1(0) >Vc2(0), as shown in FIG. 7B, the cross current i flows from the capacitor C1 to the capacitor C2, and the inter-terminal voltages of the two capacitors at time t are given by the following equations (2) and (3):

[Expression 2]

$$Vc1(t) = Vc1(0) - \frac{b\{Vc1(0) - Vc2(0)\}}{(a+b)}\{1 - \exp(-t/Tc)\} \qquad (2)$$

-continued

[Expression 3]

$$Vc2(t) = Vc2(0) + \frac{a\{Vc1(0) - Vc2(0)\}}{(a+b)}\{1 - \exp(-t/Tc)\}, \quad (3)$$

where

[Expression 4]

$$Tc = \frac{ab}{a+b} \times CR \text{ [sec]}. \quad (4)$$

Voltage equalization is started at a time constant Tc represented by Equation (4), and in a stationary state after a sufficient amount of time has passed, the inter-terminal voltages of the two capacitors become the same.

In the following description, the final voltage value in the stationary state is denoted by Vinf. The final value Vinf is given by the following equation (5):

[Expression 5]

$$Vinf = \frac{aVc1(0) + bVc2(0)}{a+b}. \quad (5)$$

In the case of Vc1(0)<Vc2(0), the current flows in a direction opposite to that of FIG. 7B, and in FIG. 8, the magnitude relationship between Vc1(0) and Vc2(0) is merely reversed, whereby voltage equalization is performed in the same manner as described above, and thus the following description discusses only the case of Vc1(0)>Vc2(0).

Here, generally, how close exp(−t/Tc) in Equations (2) and (3) approaches the final value according to the value corresponding to time t is shown in Table 1.

TABLE 1

| Parallel connection time t [sec] | Ratio at which inter-terminal voltage approaches the final value | Percentage at which inter-terminal voltage approaches the final value (%) |
|---|---|---|
| Tc | 1/e ≈ 0.368 | (36.8%) |
| 2Tc | 1/e² ≈ 0.135 | (13.5%) |
| 3Tc | 1/e³ ≈ 0.050 | (5.0%) |

In Table 1, the ratio (percentage) at which the inter-terminal voltage approaches the final value is as follows if it is assumed that the inter-terminal voltage of the capacitor C1 at time t when the switch S shown in FIG. 7A is closed at time 0 is denoted by Vc1(t),

[Expression 6]

$$\frac{|Vc1(t) - Vinf|}{|Vc1(0) - Vinf|}.$$

Figure 9:
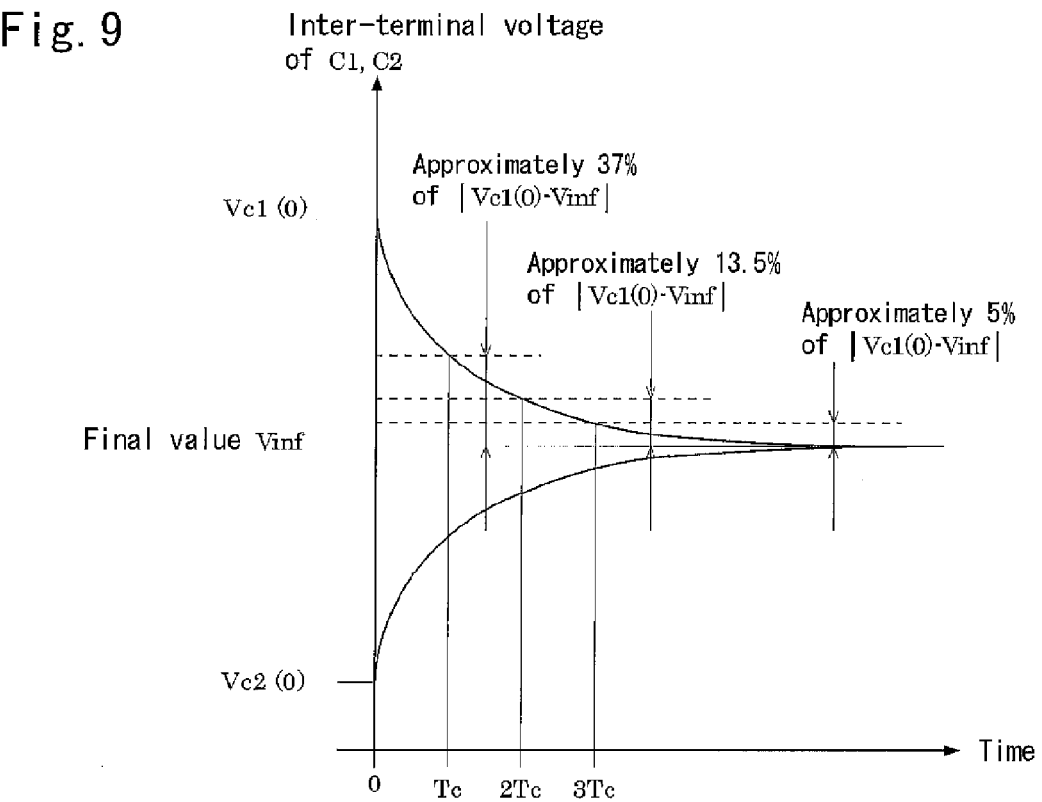
FIG. 9 is a diagram showing temporal changes in the inter-terminal voltages of the capacitors shown in FIG. 7A and FIG. 7B.

Accordingly, it can be seen from Table 1 and FIG. 9 that in the case where the switch S shown in FIG. 7A is closed at time 0, and the capacitors C1 and C2 are connected in parallel only during the time ΔT [sec], for example, in order to cause the absolute value of the difference between Vinf and the inter-terminal voltage Vc1(ΔT) of the capacitor C1 at time ΔT to be within approximately 37% of the absolute value of the difference between Vc1(0) and Vinf, or in other words, in order to establish the following equation (6), setting is performed such that the following equation (7) is established. FIG. 9 shows temporal changes in the inter-terminal voltages of the capacitors C1 and C2, as in FIG. 8.

[Expression 7]

$$|Vc1(\Delta T) - Vinf| \leq |Vc1(0) - Vinf| \times 0.37 \quad (6)$$

[Expression 8]

$$\Delta T \geq Tc \text{ [sec]} \quad (7)$$

At this time, the absolute value of the difference between Vinf and the inter-terminal voltage Vc2(ΔT) of the capacitor C2 at time ΔT also falls within approximately 37% of the absolute value of the difference between Vc2(0) and Vinf.

Accordingly, in the case where the electric storage unit 21 is implemented with 2n capacitors as in FIG. 2, the time Tp [sec] for one cycle required to sequentially connect in parallel the capacitors C1 and C2, the capacitors C2 and C3, . . . , the capacitors C2n−1 and C2n, and the capacitors C2n and C1, starting from the capacitors C1 and C2 is given by the following equation (8) if, for example, ΔT is set to a value that satisfies Equation (7):

[Expression 9]

$$Tp = \Delta T \times 2n \geq Tc \times 2n \text{ [sec]} \quad (8).$$

In the case where there are errors in the electrostatic capacity of the capacitors of the electric storage unit 21, the time at which the largest variation occurs in the inter-terminal voltage of 2n capacitors during a charging/discharging process is the time immediately before series/parallel switching is performed after charging is started from a state in which all capacitors are connected in series and the electric storage unit voltage Vt reaches a preset first voltage value Uv without voltage equalization being performed, or in other words, immediately before a single parallel section is formed.

Generally, the electric storage unit 21 is implemented with capacitors that have the same nominal electrostatic capacity and whose electrostatic capacity errors are within the same range. Accordingly, in the following description, the nominal electrostatic capacity of 2n capacitors constituting the electric storage unit 21 is denoted by C [F], the lower limit value of the electrostatic capacity accepted by rating is denoted by aC [F], the upper limit value of the electrostatic capacity accepted by rating is denoted by bC [F] (i.e., a≤1≤b), and it is assumed that as shown in FIG. 10, the electric storage unit 21 is implemented with 2n capacitors, where the electrostatic capacity of the capacitor C1 is denoted by aC [F], the electrostatic capacity of the capacitor C2 is denoted by bC [F], and the electrostatic capacity of the remaining 2n−2 capacitors is denoted by C [F].

Figure 10:
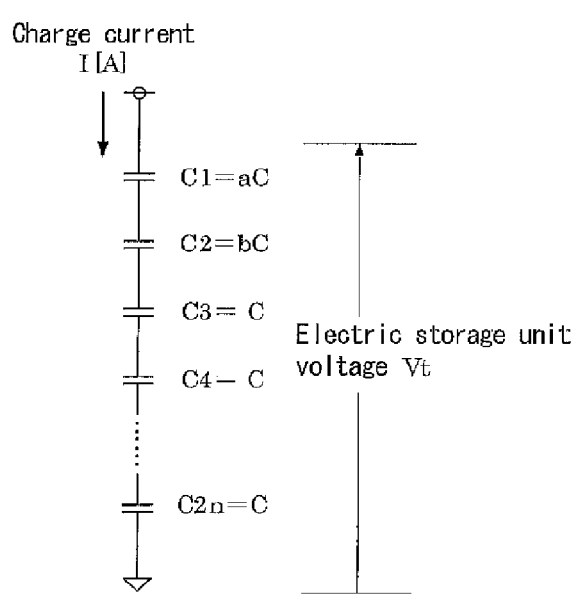
FIG. 10 is an illustrative diagram for calculating parallel connection time ΔT.
Figure 11:
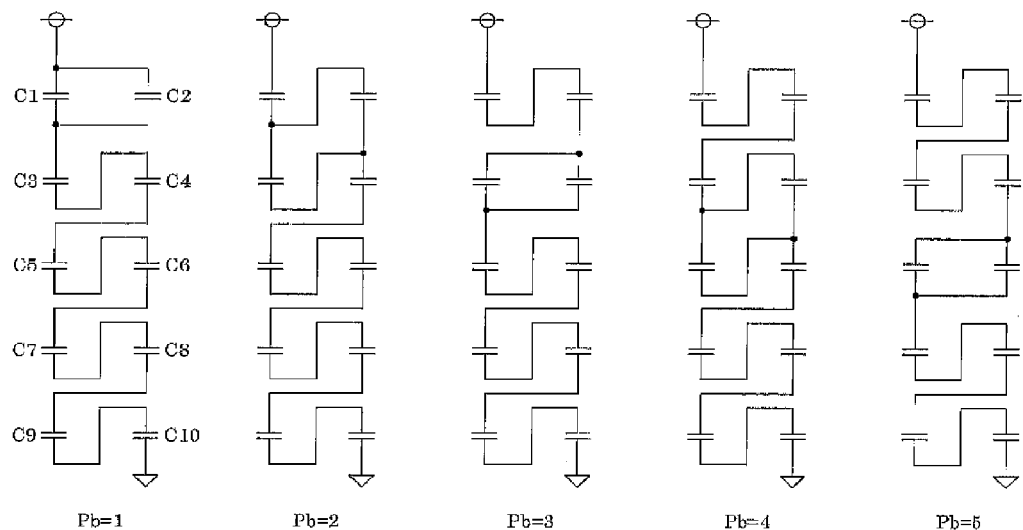
FIG. 11 shows, in a simplified form, paralleled patterns in the case where there is one parallel section in an electric storage unit including 10 capacitors.
Figure 11:
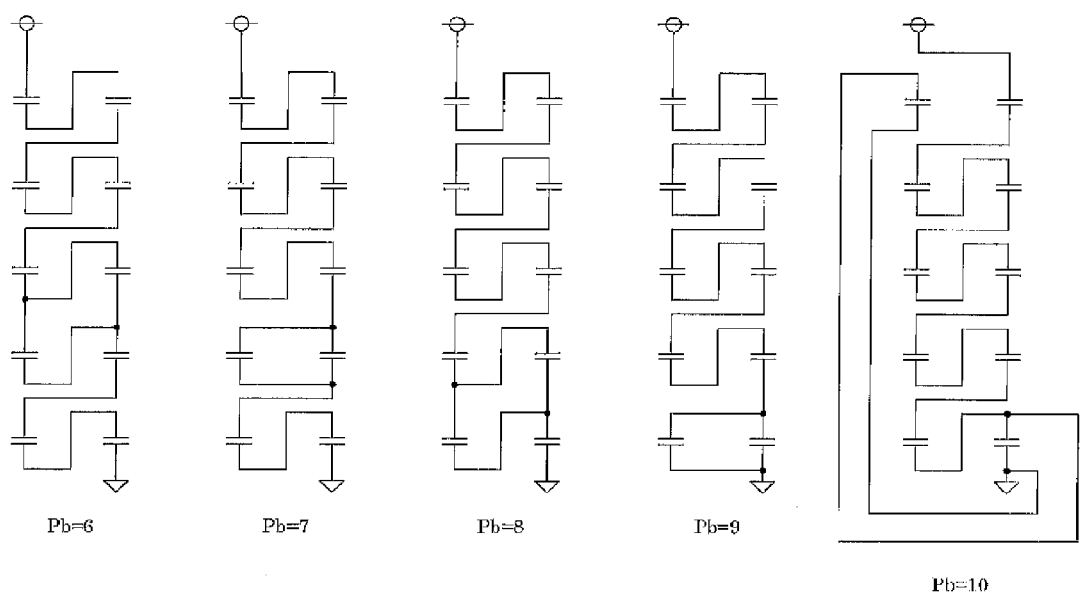

Charging is started with a charge current I [A] from a state in which all 2n capacitors Ci constituting the electric storage unit 21 are in a fully discharged state and in which all of the capacitors are connected in series as shown in FIG. 10. Furthermore, the time from the start of charging to the time immediately before the first instance of series/parallel switching is performed after the electric storage unit voltage Vt reaches a preset first voltage value Uv [V] as a result of progression of charging is denoted by T [sec].

The first voltage value Uv is usually set to the upper limit value of the acceptable input voltage range of the power conversion device 3, but the effects of the charge control method of the present invention can be produced even when the first voltage value Uv is set to a value at which the conversion efficiency of the power conversion device 3 is the highest, or in other words, to a value lower than the upper limit value of the acceptable input voltage range.

If it is assumed that at time 0, charging is started from a state in which all 2n capacitors constituting the electric storage unit 21 are in a fully discharged state and in which all of the capacitors are connected in series, and charging progresses and the electric storage unit voltage Vt reaches the preset first voltage value Uv at time T, then, the inter-terminal voltage Vc1(T) of the capacitor C1, the inter-terminal voltage Vc2(T) of the capacitor C2, and the inter-terminal voltages Vc3(T) to Vc2n(T) of the capacitors C3 to C2n immediately before the first instance of series/parallel switching is performed are represented as follows:

[Expression 10]

$$Vc1(T) = \frac{I \times T}{aC}$$

$$Vc2(T) = \frac{I \times T}{bC}$$

$$Vc3(T) = Vc4(T) = \ldots = Vc2n(T) = \frac{I \times T}{C}.$$

At this time, the sum of the inter-terminal voltages of the 2n capacitors (=electric storage unit voltage Vt) is equal to the preset first voltage value Uv, and thus the following is obtained:

[Expression 11]

$$\left\{\frac{1}{a} + \frac{1}{b} + (2n-2)\right\}\frac{I \times T}{C} = Uv.$$

The time from the start of charging from the state in which all capacitors are connected in series to the time when the electric storage unit voltage Vt reaches the first voltage value Uv is represented as follows:

[Expression 12]

$$T = \frac{Uv \times C}{I \times \left\{\frac{1}{a} + \frac{1}{b} + (2n-2)\right\}}.$$

Accordingly, among the 2n capacitors, the inter-terminal voltage Vc1(T) of the capacitor C1 at time T, the capacitor C1 having the smallest electrostatic capacity and a high inter-terminal voltage is represented as follows:

$$Vc1(T) = Uv \Big/ \left\{\left(\frac{1}{a} + \frac{1}{b} + 2n - 2\right)a\right\}. \quad \text{[Expression 13]}$$

The inter-terminal voltage Vc2(T) of the capacitor C2 having the largest electrostatic capacity and a low inter-terminal voltage is represented as follows:

$$Vc2(T) = Uv \Big/ \left\{\left(\frac{1}{a} + \frac{1}{b} + 2n - 2\right)b\right\}. \quad \text{[Expression 14]}$$

Therefore, the maximum difference value ΔVmax between the inter-terminal voltages of the 2n capacitors is given by the following equation (9):

[Expression 15]

$$\Delta V\max = Vc1(T) - Vc2(T) = Uv\left(\frac{1}{a} - \frac{1}{b}\right) \Big/ \left(\frac{1}{a} + \frac{1}{b} + 2n - 2\right). \quad (9)$$

Here, it is assumed that voltage equalization is performed by parallelizing the capacitors C1 and C2 only for time ΔT at time T. If an attempt is made to cause the absolute value of the difference between Vinf and the inter-terminal voltage Vc1(T+ΔT) (where ΔT=Tc) of the capacitor C1 to be within approximately 37% of the absolute value of the difference between Vc1(T) and Vinf, without considering the charge current I flowing into the capacitors C1 and C2 after time T, then, the following equations (10) and (11) are established from Equation (6):

[Expression 16]

$$Vc1(T+\Delta T) \leq Vc1(T) \times 0.37 + Vinf \times 0.63 \quad (10),$$

[Expression 17]

$$Vc2(T+\Delta T) \geq Vc2(T) \times 0.37 + Vinf \times 0.63 \quad (11).$$

However, in reality, the capacitors C1 and C2 are continuously charged even after time T, and thus the inter-terminal voltage Vc1(T+2nΔT) of the capacitor C1 and the inter-terminal voltage Vc2(T+2nΔT) of the capacitor C2 at time T+2nΔT, which is the time elapsed from time T for a length of time corresponding to the time Tp for one cycle=2nΔT (=2nTc), are given by the following equations (12) and (13):

[Expression 18]

$$Vc1(T + 2n\Delta T) \leq Vc1(T) \times 0.37 + Vinf \times 0.63 + \frac{I \times 2n\Delta T}{aC}, \quad (12)$$

[Expression 19]

$$Vc2(T + 2n\Delta T) \geq Vc2(T) \times 0.37 + Vinf \times 0.63 + \frac{I \times 2n\Delta T}{bC}. \quad (13)$$

Note that the charge current during ΔT in which the capacitor C1 and the capacitor C2 are parallelized is approximately ½ that of when they are connected in series. However, in order to simplify the calculation, with Equations (12) and (13) given above, calculation is performed assuming that the charge current to the respective capacitors is the same as that when they are connected in series.

Accordingly, the actual values of Vc1(T+2nΔT) and Vc2(T+2nΔT) are smaller than the values obtained from Equations (12) and (13), and a is smaller than b (a<b), and therefore the difference between Vc1(T+2nΔT) and Vc2(T+2nΔT) obtained from Equations (12) and (13) becomes larger than the actual value.

From Equations (12), (13) and (9), the following equation (14) is established:

[Expression 20]

$$Vc1(T + 2n\Delta T) - Vc2(T + 2n\Delta T) \leq \quad (14)$$
$$\{Vc1(T) - Vc2(T)\} \times 0.37 + I \times 2n\Delta T\left(\frac{1}{a} - \frac{1}{b}\right) \Big/ C =$$
$$\{Vc1(T) - Vc2(T)\}\left\{0.37 + I \times 2n\Delta T \times \left(\frac{1}{a} + \frac{1}{b} + 2n - 2\right) \Big/ UvC\right\}.$$

Accordingly, in order to reduce the difference in inter-terminal voltage between the capacitor C1 and the capacitor C2 at time (T+2nΔT), which is the time elapsed from time T for a length of time corresponding to the time Tp for one cycle (=2nΔT), or in other words, in order to establish the following equation (15), the following equation (16) needs to be established from Equation (14):

[Expression 21]

$$Vc1(T + 2n\Delta T) - Vc2(T + 2n\Delta T) \le Vc1(T) - Vc2(T), \quad (15)$$

[Expression 22]

$$0.37 + I \times 2n\Delta T \times \left(\frac{1}{a} + \frac{1}{b} + 2n - 2\right) \bigg/ UvC < 1. \quad (16)$$

Accordingly, from Equation (16), the charge current I needs to satisfy the following equation (17):

[Expression 23]

$$I < 0.63 \times UvC \bigg/ \left\{2n\Delta T \times \left(\frac{1}{a} + \frac{1}{b} + 2n - 2\right)\right\}. \quad (17)$$

In the case where the charge current I satisfies the condition given by Equation (17), the difference in inter-terminal voltage between the capacitor C1 and the capacitor C2 at time (T+2mnΔT), which is the time elapsed from time T for a length of time corresponding to m cycles is given by the following equation (18):

[Expression 24]

$$Vc1(T + 2mn\Delta T) - Vc2(T + 2mn\Delta T) \le \quad (18)$$
$$\{Vc1(T) - Vc2(T)\}\left\{0.37 + I \times 2n\Delta T \times \left(\frac{1}{a} + \frac{1}{b} + 2n - 2\right)\bigg/ UvC\right\}^m.$$

In the above example, ΔT is set to Tc (ΔT=Tc), but the upper limit value of the charge current represented by Equation (17) becomes smaller as ΔT is set to be larger than Tc, and the rate of decrease in the difference in inter-terminal voltage between the capacitor C1 and the capacitor C2 at time (T+2mnΔT) represented by Equation (18) also decreases, the time (T+2mnΔT) being the time elapsed from time T for a length of time corresponding to m cycles.

Here, consideration is given to a case where, for example, the electric storage unit 21 is implemented with 10 capacitors having a nominal electrostatic capacity C of 1700 [F] and all of the capacitors are connected in series, or in other words, to the case of n=5. Generally, the electrostatic capacity error of electric double layer capacitors is approximately ±20%, and thus a is set to 0.8 (a=0.8), b is set to 1.2 (b=1.2), and the charge current I is set to 1 [A](charge current I=1 [A]), and the resistance R in the parallel circuit such as switches is set to 10 [mΩ] (R=10 [mΩ]). Then, it is assumed that, by a single instance of parallelization, the difference in inter-terminal voltage between the capacitors C1 and C2 is reduced to be less than or equal to approximately 37% of the absolute value of the difference in inter-terminal voltage immediately before the parallelization.

When the time constant Tc is obtained from Equation (4), the following is obtained:

$$Tc = \frac{ab}{(a+b)}CR = \quad \text{[Expression 25]}$$
$$\frac{0.8 \times 1.2}{0.8 + 1.2} \times CR = 0.48 \times 1700 \times 10 \times 10^{-3} = 8.16[\text{sec}].$$

Therefore, when the time Tp [sec] for one cycle is obtained from Equations (7) and (8) assuming that the parallel connection time ΔT [sec] is equal to the value corresponding to Tc, the following is obtained:

[Expression 26]

$$\Delta T = Tc = 8.16[\text{sec}]$$

$$Tp = \Delta T \times 2n = Tc \times 2n = 8.16 \times 10 = 81.6[\text{sec}].$$

Also, when the preset first voltage value Uv is set to 14.5 [V], from Equation (17), the following is obtained:

$$I < 0.63 \times 14.5 \times 1700 \bigg/ \quad \text{[Expression 27]}$$
$$\left\{10 \times 8.16 \times \left(\frac{1}{0.8} + \frac{1}{1.2} + 10 - 2\right)\right\} = 18.88[A].$$

Therefore, it can be seen that the condition that the charge current is 1 [A] satisfies the above equation.

Furthermore, when the maximum difference value ΔVmax between the inter-terminal voltage Vc1(T) of the capacitor C1 and the inter-terminal voltage Vc2(T) of the capacitor C2 immediately before the first instance of series/parallel switching is performed is represented as follows from Equation (9):

$$\Delta Vmax = \quad \text{[Expression 28]}$$
$$14.5 \times \left(\frac{1}{0.8} - \frac{1}{1.12}\right) \bigg/ \left(\frac{1}{0.8} + \frac{1}{1.2} + 10 - 2\right) \approx 0.6[V].$$

However, from Equation (14), the maximum difference value of inter-terminal voltage between the capacitor C1 and the capacitor C2 after the first instance of parallelization is as follows:

$$Vc1(T + 2n\Delta T) - Vc2(T + 2n\Delta T) \le \quad \text{[Expression 29]}$$
$$\{Vc1(T) - Vc2(T)\}\bigg\{0.37 + 1 \times 10 \times 8.16 \times$$
$$\left(\frac{1}{0.8} + \frac{1}{1.2} + 10 - 2\right)\bigg/(14.5 \times 1700)\bigg\} =$$
$$\Delta Vmax\bigg\{0.37 + 1 \times 10 \times 8.16 \times$$
$$\left(\frac{1}{0.8} + \frac{1}{1.2} + 10 - 2\right)\bigg/(14.5 \times 1700)\bigg\} \approx$$
$$\Delta Vmax \times 0.4 \approx 0.6 \times 0.4 = 0.24[V].$$

Therefore, it can be seen that voltage equalization is performed.

Also, from Equation (18), the maximum difference value of inter-terminal voltage between the capacitor C1 and the capacitor C2 after m instances of parallelization is as follows:

$$Vc1(T + 2mn\Delta T) - Vc2(T + 2mn\Delta T) \le \quad \text{[Expression 30]}$$
$$\Delta Vmax \times 0.4^m \approx 0.6 \times 0.4^m.$$

Therefore, for example, the maximum difference value of inter-terminal voltage between the capacitor C1 and the capacitor C2 after the fourth instance of parallelization is approximately 0.015 [V].

From the practical point of view, it is also necessary to give consideration to the cross current value. In the case where two capacitors having different inter-terminal voltages are connected in parallel, as shown in FIG. 7B, the cross current i flows through the switch S. If the value of the cross current is excessively large, the switch S may be broken. Particularly when the switch S is made with a semiconductor, care needs to be taken to the value of the cross current.

Here, if it is assumed that the maximum cross current value (maximum cross current) is denoted by Ismax, and the resistance value within the parallel circuit such as the on-resistance of the switch S is denoted by R [Ω], the maximum difference value of inter-terminal voltage between two capacitors immediately before parallelization is $\Delta V$max, and thus from Equation (9), the following equation (19) is established, and Equation (20) is obtained.

[Expression 31]

$$\Delta V\max = Uv\left(\frac{1}{a} - \frac{1}{b}\right) \Big/ \left(\frac{1}{a} + \frac{1}{b} + 2n - 2\right) = R \times I\text{smax} \quad (19)$$

[Expression 32]

$$\therefore I\text{smax} = \Delta V\max/R = Uv\left(\frac{1}{a} - \frac{1}{b}\right) \Big/ \left\{\left(\frac{1}{a} + \frac{1}{b} + 2n - 2\right)R\right\} \quad (20)$$

Here, as in the previous example, when setting is made such that Uv=14.5 [V], a=0.8, b=1.2, n=5, R=10 [mΩ]=10× $10^{-3}$ [Ω], from Equation (20), the following is obtained:

$$I\text{smax} = \Delta V\max/R \approx \frac{0.6}{10 \times 10^{-3}} = 60 [A]. \quad \text{[Expression 33]}$$

Accordingly, it is necessary to use, as the switch S shown in FIG. 7, a device that can withstand a cross current of 60 [A] or greater.

Next, the second processing of the charge control method according to the present invention will be described. In the case where all capacitors constituting the electric storage unit 21 are in a fully discharged state, charging is started from the state in which all capacitors constituting the electric storage unit 21 are connected in series, but voltage equalization by parallelization of the capacitors is not performed in this state.

In the case where the electric storage unit 21 is implemented with 2n capacitors Ci as shown in FIG. 2, in the charging process, each time the electric storage unit voltage Vt reaches the preset first voltage value Uv by series/parallel switching, the number P of parallel sections increases from 1, 2, ..., n, and finally the capacitors C1 and C2, the capacitors C3 and C4, the capacitors C5 and C6, ..., the capacitors C2n−1 and C2n, and the capacitors C2n and C1 are connected in parallel.

In the case where the electric storage unit 21 is implemented with 2n capacitors, the number P of parallel sections varies from 1 to n by series/parallel switching, but there are, at the maximum, 2n combinations (hereinafter, referred to as "paralleled patterns") of series and parallel connections of the capacitors with respect to the number P of parallel sections being 1, 2, ..., (n−1). When the number P of parallel sections is n, there are two paralleled patterns.

For example, in the case where the electric storage unit is implemented with 10 (n=5) capacitors, the number P of parallel sections becomes 5 (=2n/2=10/2) at the maximum by series/parallel switching. In the case where the number P of parallel sections is 1 to 4, there are at the maximum 10 paralleled patterns for each value as shown in FIGS. 11 to 14. In FIGS. 11 to 14, ten paralleled patterns are indicated by Pb=1, Pb=2, ..., Pb=10.

Figure 12:
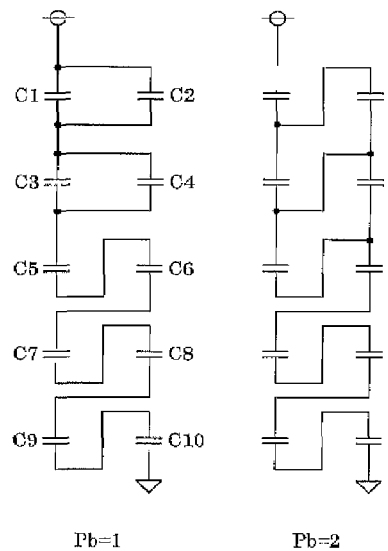
FIG. 12 shows, in a simplified form, paralleled patterns in the case where there are two parallel sections in an electric storage unit including 10 capacitors.
Figure 12:
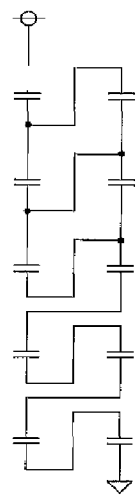
Figure 12:
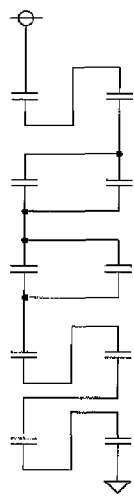
Figure 12:
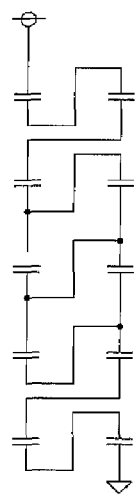
Figure 12:
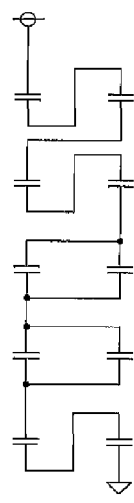
Figure 12:
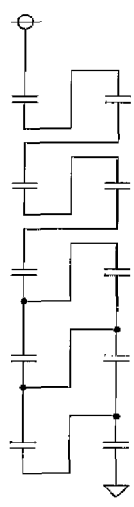
Figure 12:
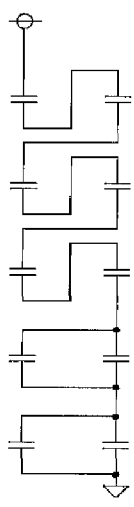
Figure 12:
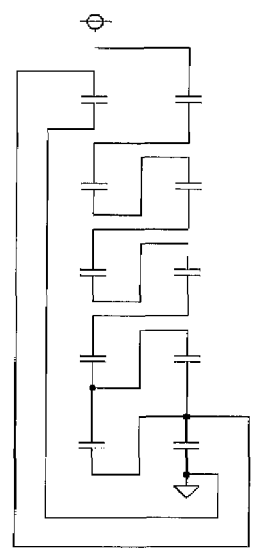
Figure 12:
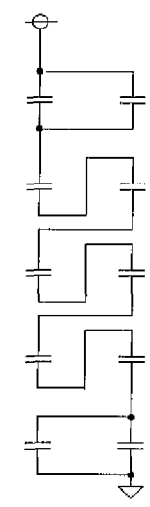
Figure 12:
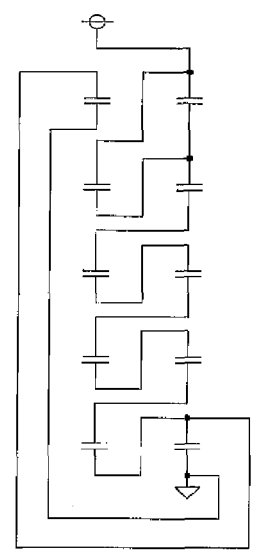
Figure 13:
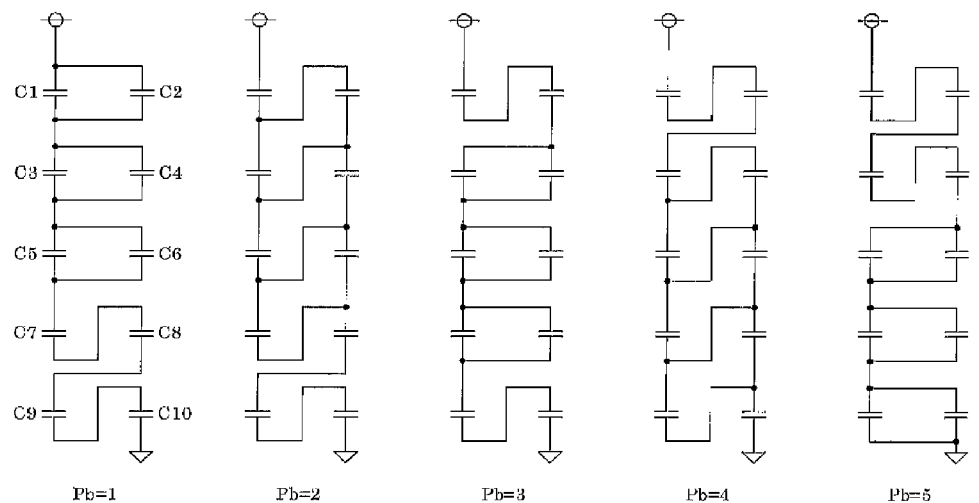
FIG. 13 shows, in a simplified form, paralleled patterns in the case where there are three parallel sections in an electric storage unit including 10 capacitors.
Figure 13:
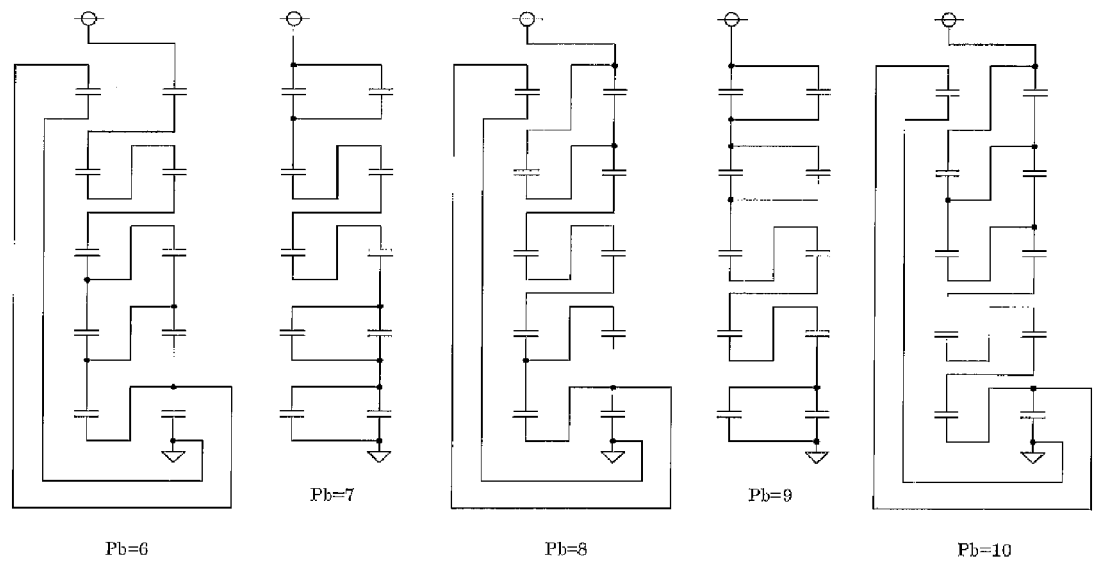
Figure 14:
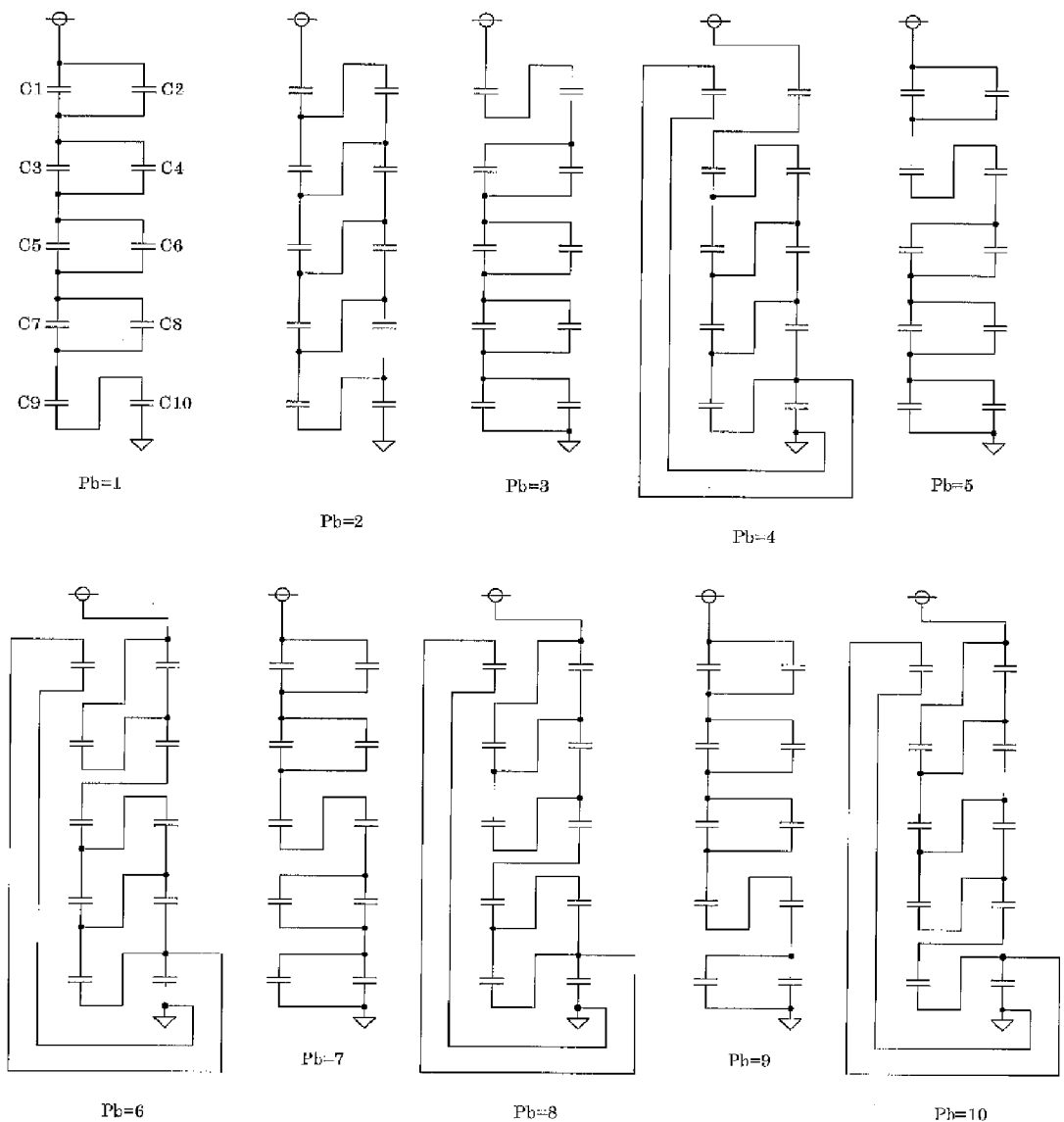
FIG. 14 shows, in a simplified form, paralleled patterns in the case where there are four parallel sections in an electric storage unit including 10 capacitors.
Figure 15:
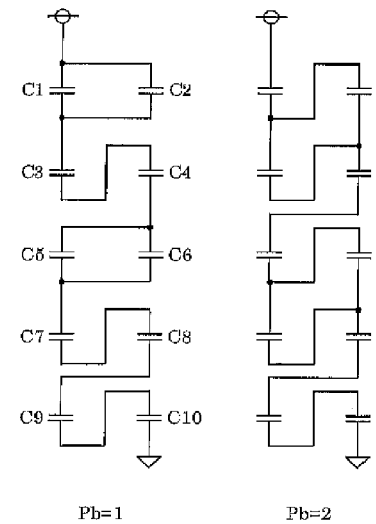
FIG. 15 shows, in a simplified form, paralleled patterns in the case where there are two parallel sections in an electric storage unit including 10 capacitors, which are different from those shown in FIG. 12.
Figure 15:
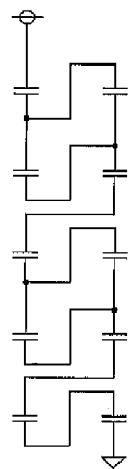
Figure 15:
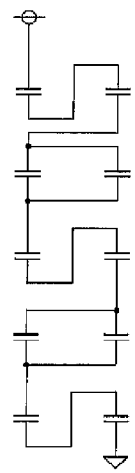
Figure 15:
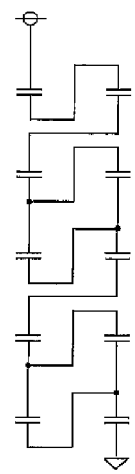
Figure 15:
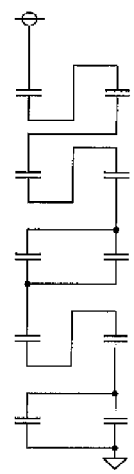
Figure 15:
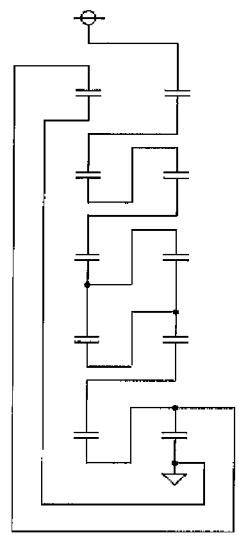
Figure 15:
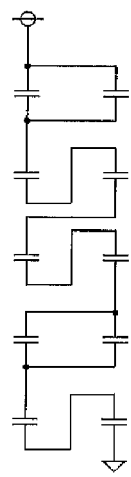
Figure 15:
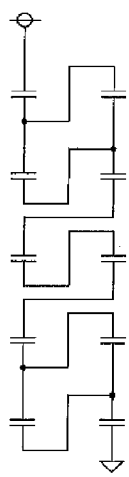
Figure 15:
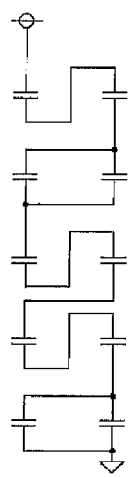
Figure 15:
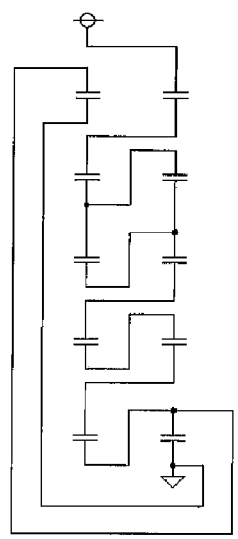

In the case where the number P of parallel sections is 2 to 4, paralleled patterns other than those shown in FIGS. 12 to 14 may be used. For example, in the case of P=2, paralleled patterns as shown in FIG. 15 may be used instead of those shown in FIG. 12.

Figure 16:
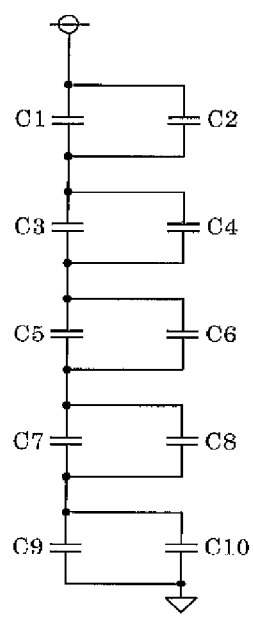
FIG. 16 shows, in a simplified form, paralleled patterns in the case where there are five parallel sections in an electric storage unit including 10 capacitors.
Figure 16:
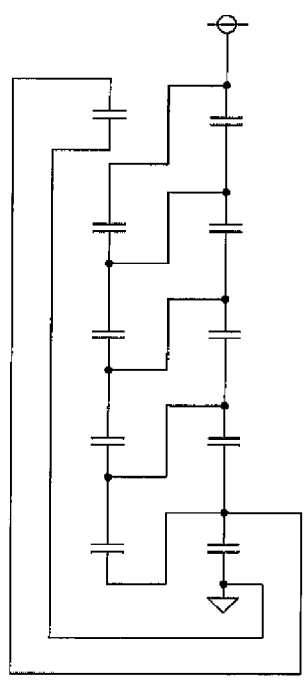

In the case where the number P of parallel sections is 5, there are two paralleled patterns as shown in FIG. 16. In FIG. 16, the two paralleled patterns are indicated by Pb=1 and Pb=2.

Accordingly, in the case where the number P of parallel sections is 1 to 4, in each of FIGS. 11 to 14, by the switches (Sa0 to Sa2n+2, Sb0 to Sb2n) in the electric storage unit 21 shown in FIG. 2 being turned on and off as appropriate, voltage equalization is started from the state Pb=1, and the parallel sections are sequentially shifted at a fixed time interval (every parallel connection time $\Delta T$) in the following order: Pb=1→Pb=2→Pb=3→ . . . →Pb=9→Pb=10→Pb=1→Pb=2→ . . . . In the case where the number P of parallel sections is 5 as well, by the switches (Sa0 to Sa2n+2, Sb0 to Sb2n) being turned on and off as appropriate, the state Pb=1 and the state Pb=2 shown in FIG. 16 are switched at a fixed time interval (every parallel connection time $\Delta T$). By repeating this operation, in each of the cases where the number P of parallel sections is 1 to 5 (P=1, P=2, ..., P=5), it is possible to suppress the difference in the inter-terminal voltage between the capacitors constituting the electric storage unit 21 and to perform voltage equalization.

Switching of the paralleled pattern of the capacitors will now be described in further detail with reference to FIGS. 12, 15 and 16. A case will be considered in which n=5, or in other words, the electric storage unit is implemented with 10 capacitors. If the number P of parallel sections is 2, each value for $k_j$ (j is an integer that satisfies $1 \leq j \leq 2$) is 0 or an even number, or in other words, $k_1$ and $k_2$ are 0 or an even number satisfying $0 \leq k_j \leq 2n-2=10-2=8$, and therefore for example, if $k_1=0$, $k_2=2$, the operation for voltage equalization by parallelization of adjacent capacitors is performed as follows.

First, i is set to 1 (i=1), and the first and second capacitors are switched to a parallel connection, the third and fourth capacitors are switched to a parallel connection, and the other capacitors are switched to a series connection (corresponding to the case of Pb=1 shown in FIG. 12).

After a predetermined period of time has passed, i is set to 2 (i=2), the second and third capacitors are switched to a parallel connection, the fourth and fifth capacitors are switched to a parallel connection, and the other capacitors are switched to a series connection (corresponding to the case of Pb=2 shown in FIG. 12).

After that, switching is performed in the same manner by increasing i by one every predetermined period of time. When i is set to 9, (i=9), the ninth and tenth capacitors are switched to a parallel connection, the eleventh (i.e., K=1, and thus first) and twelfth (i.e., K=2, and thus second) capacitors are switched to a parallel connection, and the other capacitors are switched to a series connection (corresponding to the case of Pb=9 shown in FIG. 12).

After a predetermined period of time has passed, i is set to 10, the tenth and eleventh (i.e., K=1, and thus first) capacitors are switched to a parallel connection, the twelfth (i.e., K=2, and thus second) and thirteenth (i.e., K=3, and thus third capacitor) capacitors are switched to a parallel connection, and the other capacitors are switched to a series connection (corresponding to the case of Pb=10 shown in FIG. 12). Then, after a predetermined period of time has passed, the procedure returns to the case of (i=1).

As in the above example, in the case where n=5, or in other words, the electric storage unit is implemented with 10 capacitors, and the number P of parallel sections is 2, for example, it may be possible to make setting such that $k_1=0$ and $k_2=4$. In this case, the operation for voltage equalization by parallelization of adjacent capacitors is performed as follows.

First, i is set to 1 (i=1), and the first and second capacitors are switched to a parallel connection, the fifth and sixth capacitors are switched to a parallel connection, and the other capacitors are switched to a series connection (corresponding to the case of Pb=1 shown in FIG. 15).

After a predetermined period of time has passed, i is set to 2 (i=2), the second and third capacitors are switched to a parallel connection, the sixth and seventh capacitors are switched to a parallel connection, and the other capacitors are switched to a series connection (corresponding to the case of Pb=2 shown in FIG. 15).

After that, switching is performed in the same manner by increasing i by one every predetermined period of time. When i is set to 9 (i=9), the ninth and tenth capacitors are switched to a parallel connection, the thirteenth (i.e., K=3, and thus third) and fourteenth (i.e., K=4, and thus fourth) capacitors are switched to a parallel connection, and the other capacitors are switched to a series connection (corresponding to the case of Pb=9 shown in FIG. 15).

After a predetermined period of time has passed, i is set to 10, the tenth and eleventh (i.e., K=1, and thus first) capacitors are switched to a parallel connection, fourteenth (i.e., K=4, and thus fourth) and fifteenth (i.e., K=5, and thus fifth) capacitors are switched to a parallel connection, and the other capacitors are switched to a series connection (corresponding to the case of Pb=10 shown in FIG. 15). Then, after a predetermined period of time has passed, the procedure returns to the case of i=1.

In the case where n=5, or in other words, the electric storage unit is implemented with 10 capacitors, and the number P of parallel sections is 5, each value for $k_j$ (j is an integer that satisfies $1 \le j \le 5$) is 0 or an even number, or in other words, $k_1, k_2, k_3, k_4$ and $k_5$ are 0 or an even number satisfying $0 \le k_j \le 8$ (i.e., 2n−2=10−2=8), and thus in the case of $k_1=0, k_2=2, k_3=4, k_4=6, k_5=8$, the operation for voltage equalization by parallelization of adjacent capacitors is performed as follows.

First, i is set to 1 (i=1), and the first and second capacitors, the third and fourth capacitors, the fifth and sixth capacitors, the seventh and eighth capacitors, and the ninth and tenth capacitors are switched to a parallel connection (corresponding to the case of Pb=1 shown in FIG. 16).

After a predetermined period of time has passed, i is set to 2 (i=2), the second and third capacitors, the fourth and fifth capacitors, the sixth and seventh capacitors, the eighth and ninth capacitors, and the tenth and eleventh (i.e., first) capacitors are switched to a parallel connection (corresponding to the case of Pb=2 shown in FIG. 16). Then, after a predetermined period of time has passed, i is set to 3 (i=3), the third and fourth capacitors, the fifth and sixth capacitors, the seventh and eighth capacitors, the ninth and tenth capacitors, and the eleventh, (i.e., first) and twelfth (i.e., second) capacitors are switched to a parallel connection (i.e., returning to the case of Pb=1 shown in FIG. 16). After that, switching is performed in the same manner by increasing i by one every predetermined period of time until i is increased to 10. When i is set to 10, switching is performed in the same manner, and after a predetermined period of time has passed, the procedure returns to the case of i=1.

<Sequence of Operations of Charge Control>

Next, a sequence of operations of charge control in the charge control method of the present invention will be described.

Generally, with symmetric capacitors, only an upper rated voltage is set for the inter-terminal voltage. If charging is continued over the upper rated voltage, overcharge occurs to cause electrolysis of the electrolyte, causing a degradation or in the worst case a breakage. Accordingly, a sequence of operations of charge control will be described that is performed in the case where the capacitors Ci constituting the electric storage unit 21 are 2n capacitors Ci in which only an upper rated voltage has been set for the inter-terminal voltage.

Figure 17:
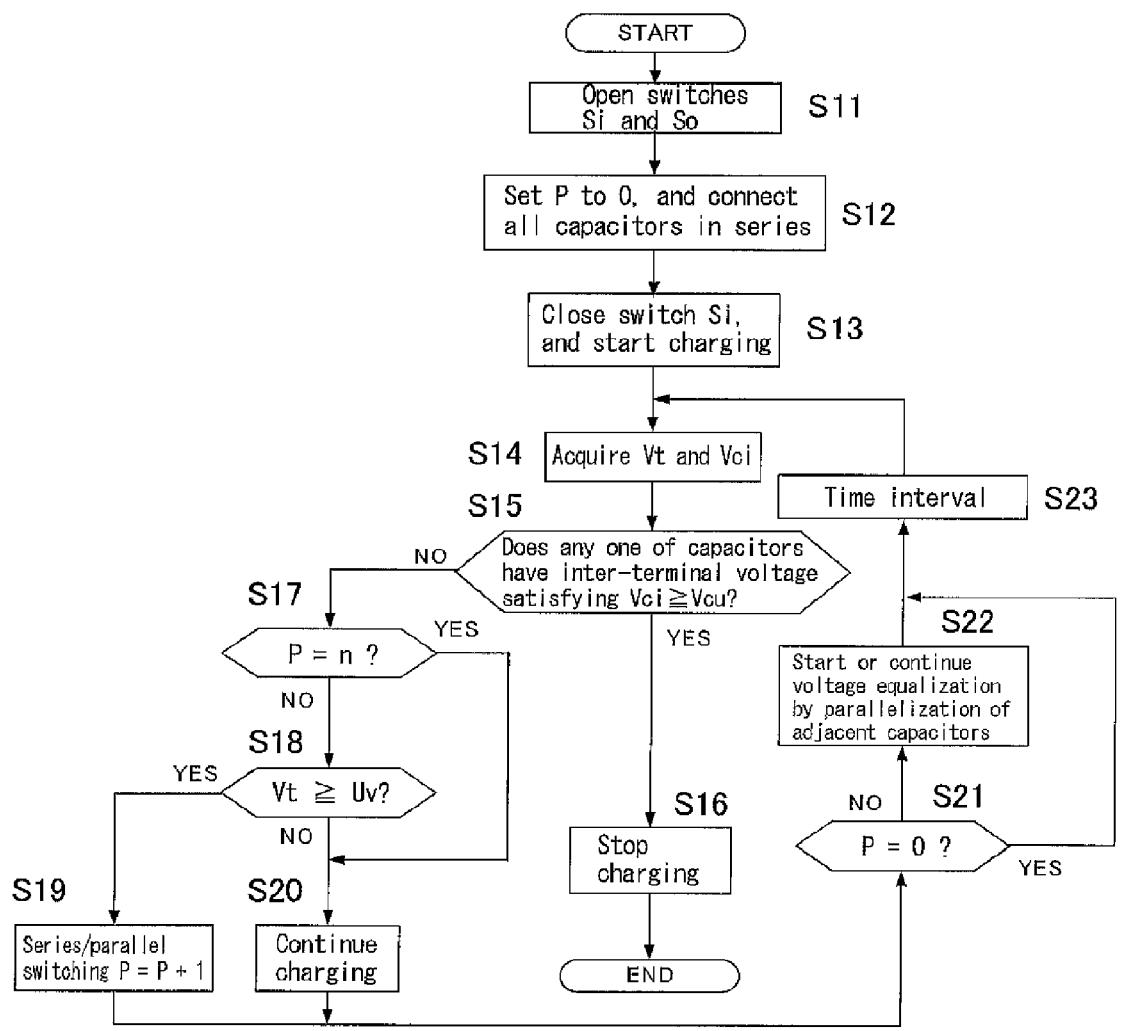
FIG. 17 is a flowchart for carrying out a charge control method according to the present invention.

FIG. 17 shows a flowchart of charge control in the case where an electric storage unit 21 having the configuration shown in FIG. 2 is used.

It is assumed that at the time of the start of charge control, the capacitors Ci (i=1, 2, . . . , 2n) of the electric storage unit 21 are in a fully discharged state, or in other words, no charges are stored in all capacitors. In step S11, the control circuit 26 sets the switch Si and the switch So shown in FIG. 2 to be off (open).

Next, in step S12, the control circuit 26 instructs the series/parallel switching circuit 23 to set the number P of parallel sections to 0 (zero), and connects all capacitors Ci in series. After that, in step S13, the control circuit 26 closes the switch Si and starts charging.

In step S14, the control circuit 26 acquires the electric storage unit voltage Vt, which is an output voltage of the electric storage unit 21 measured by the electric storage unit voltage detection circuit 25, and also acquires the inter-terminal voltage Vci of each capacitor Ci of the electric storage unit 21 measured by the inter-terminal voltage detection circuit 24.

In step S15, the control circuit 26 determines whether or not the inter-terminal voltage Vci of each capacitor Ci is greater than or equal to the upper rated voltage Vcu. If the inter-terminal voltage Vci of any one of the capacitors Ci is greater than or equal to the upper rated voltage Vcu (YES), control advances to the processing of step S16, and stops charging. In other words, the control circuit 26 sets the switch Si to be off (open). If, on the other hand, none of the capacitors Ci reaches an inter-terminal voltage Vci exceeding the upper rated voltage Vcu (NO), control advances to the processing of step S17.

In step S17, the control circuit 26 determines whether or not the number P of parallel sections is n. If it is determined that the number P of parallel sections is n (YES), control advances to the processing of step S20, and continues charging. If, on the other hand, it is determined that the number P of parallel sections is not n (NO), control advances to the processing of step S18.

In step S18, the control circuit 26 determines whether or not the electric storage unit voltage Vt is greater than or equal to the first voltage value Uv. If it is determined that the electric storage unit voltage Vt is greater than or equal to the first voltage value Uv (YES), control advances to the processing of step S19, and the control circuit 26 instructs the series/parallel switching circuit 23 to increase the number P of parallel sections by one. If, on the other hand, it is determined that the electric storage unit voltage Vt is less than the first voltage value Uv (NO), control advances to the processing of step S20, and continues charging. After the processing of steps S19 and S20, control advances to the processing of step S21.

In step S21, the control circuit 26 determines whether or not the number P of parallel sections is 0. If it is determined that the number P of parallel sections is 0 (YES), control advances to the processing of step S23, waits for a time interval, or in other words, the parallel connection time ΔT to pass, and thereafter returns to the processing of step S14. If, on the other hand, it is determined that the number P of parallel sections is not 0 (NO), control advances to the processing of step S22.

In step S22, the control circuit 26 starts or continues voltage equalization by parallelization of adjacent capacitors, and in step S23, control waits for a time interval, or in other words, the parallel connection time ΔT to pass.

The processing in accordance with the flowchart of FIG. 17 is summarized as follows. Charging is started from a state in which all capacitors Ci are connected in series, and when the electric storage unit voltage Vt reaches the preset first voltage value Uv (YES in step S18), series/parallel switching is performed, and the number P of parallel sections is set to 1 (step S19). At the same time, voltage equalization by parallelization of adjacent capacitors is started (step S21, S22).

The voltage equalization by parallelization of adjacent capacitors is repeated while charging is continued, and each time the electric storage unit voltage Vt reaches the preset first voltage value Uv, series/parallel switching is performed and the number P of parallel sections is increased by one (step S18, S19, S21, S22, S23, S14).

Charging progresses in a state in which the number P of parallel sections is n, and when any one of the capacitors Ci reaches an inter-terminal voltage Vci greater than or equal to the upper rated voltage Vcu, charging is stopped (step S14, S15, S16).

While all capacitors Ci are connected in series, even if the electric storage unit voltage Vt reaches the first voltage Uv, the inter-terminal voltages Vci of the capacitors Ci do not reach the upper rated voltage Vcu.

(Embodiment 2)

In the present embodiment, a discharge control method according to the present invention will be described. The electric storage apparatus 2 and the electric storage unit 21 used for discharge control have the same configurations as those of Embodiment 1.

A feature of the discharge control method of the present invention is that if, in an electric storage unit implemented with 2n capacitors, a unit in which two adjacent capacitors are connected in parallel is denoted by a parallel section, the following first processing (1) and second processing (2) are repeated from a state in which the number P of parallel sections is n until all capacitors are connected in series.

First processing (1), when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other electric double layer capacitors are caused to be in a series connection state, where when K is an integer, a $(2n+K)$th electric double layer capacitor is a Kth electric double layer capacitor.

Second processing (2), when the voltage of the electric storage means reaches a preset second voltage value, the number P of parallel sections is decreased by one.

Voltage equalization by parallelization of adjacent capacitors is performed in a discharging process as well. When capacitors having electrostatic capacity errors are connected in series, the inter-terminal voltage of the capacitor having a small electrostatic capacity decreases more rapidly than that of the capacitor having a large electrostatic capacity. Accordingly, in the discharging process as well, if voltage equalization by parallelization of adjacent capacitors is not performed, the time until the inter-terminal voltage Vt of the electric storage unit 21 reaches the lower limit value of the acceptable input voltage range of the power conversion device 3 is reduced, as a result of which the discharge time (the operating time of the power conversion device) is shortened.

Accordingly, by performing voltage equalization by parallelization of adjacent capacitors even in the discharging process, the discharge time of the electric storage unit 21 (the operating time of the power conversion device 3) can be increased.

A case will be described below where discharging is started from a state in which all capacitors constituting the electric storage unit 21 are in a substantially fully charged state and in which all capacitors are connected, two by two, in parallel. As discharging progresses, the electric storage unit voltage Vt decreases, and each time the electric storage unit voltage Vt reaches a preset second voltage value, series/parallel switching is performed.

For example, in the case where the number of capacitors constituting the electric storage unit 21 is eight as in FIG. 4 described above, the number P of parallel sections decreases to 4, 3, 2, 1, and finally all capacitors are connected in series.

With asymmetric capacitors, there are cases where an upper rated voltage and a lower rated voltage are set for the inter-terminal voltage. In the case where such capacitors in which an upper rated voltage and a lower rated voltage have been set for the inter-terminal voltage are used as the capacitors constituting the electric storage unit 21, if charging is continued over the upper rated voltage, overcharge occurs, causing electrolysis of the electrolyte. Alternatively, if the voltage reaches the lower rated voltage or lower due to overdischarge, the electrodes collapse, causing a degradation or in the worst case a breakage.

Accordingly, the discharge control of the electric storage unit 21 needs to be divided into two cases: the case where only an upper rated voltage has been set for the inter-terminal voltage Vci of the capacitors Ci constituting the electric storage unit 21; and the case where an upper rated voltage and a lower rated voltage have been set.

A description will be given below of a discharge control method in the case where the electric storage unit 21 is implemented with 2n capacitors Ci in which only an upper rated voltage has been set for the inter-terminal voltage. In the following description, the preset second voltage value is denoted by Lv.

The second voltage value Lv is usually set to the lower limit value of the acceptable input voltage range of the power conversion device 3, but the effects of the charge control method of the present invention can be produced even when the second voltage value Lv is set to a value at which the conversion efficiency of the power conversion device 3 is the highest, or in other words, a value higher than the lower limit value of the acceptable input voltage range.

<Sequence of Operations of Discharge Control>

Figure 18:
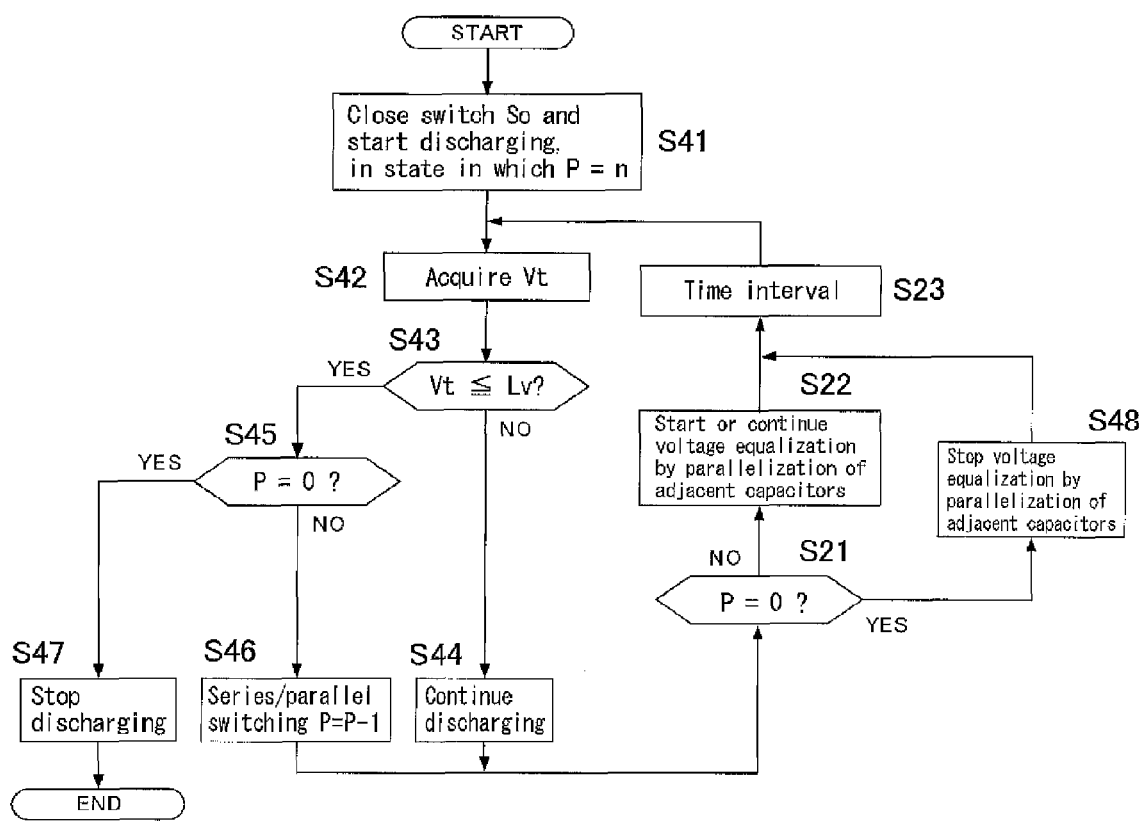
FIG. 18 is a flowchart for carrying out a discharge control method according to the present invention.

FIG. 18 shows a flowchart of discharge control in the case where the electric storage unit 21 is implemented with 2n capacitors as in FIG. 2. In the diagram, the same reference numerals are given to steps that are the same as those of FIG.

17. Hereinafter, a sequence of operations of discharge control will be described with reference to FIGS. 1 and 2 and the flowchart of FIG. 18.

It is assumed that, immediately before the start of discharge control, the switch Si and the switch So shown in FIG. 1 are open, the capacitors Ci in the electric storage unit 21 are in a substantially fully charged state, and the number P of parallel sections is n.

First, in step S41, the control circuit 26 closes the switch So, and starts discharging.

In step S42, the control circuit 26 acquires the electric storage unit voltage Vt measured by the electric storage unit voltage detection circuit 25, and then in step S43, determines whether or not the electric storage unit voltage Vt is less than or equal to the preset second voltage value Lv. If it is determined that the electric storage unit voltage Vt is less than or equal to the second voltage value Lv (YES), control advances to the processing of step S45. Otherwise (NO), control advances to the processing of step S44, where discharging is continued.

In step S45, the control circuit 26 determines whether or not the number P of parallel sections is zero. If it is determined that the number P of parallel sections is zero (YES), control advances to the processing of step S47, where discharging is stopped. In other words, the control circuit 26 opens the switch So. If, on the other hand, the number P of parallel sections is not zero (NO), control advances to the processing of step S46, where the number P of parallel sections is decreased by one (P−1). After the processing of steps S44 and S46, control transitions to the processing of step S21.

In step S21, the control circuit 26 again determines whether or not the number P of parallel sections is zero. If it is determined that the number P of parallel sections is 0 (YES), control advances to the processing of step S48, where voltage equalization by parallelization of adjacent capacitors is stopped, then in step S23, control waits for a time interval, or in other words, the time period corresponding to the parallel connection time ΔT to pass and thereafter returns to the processing of step S42. If, on the other hand, it is determined that the number P of parallel sections is not 0 (NO), control advances to the processing of step S22.

In step S22, the control circuit 26 starts or continues the voltage equalization by parallelization of adjacent capacitors, then in step S23, control waits for a time interval, or in other words, the parallel connection time ΔT to pass and thereafter returns to the processing of step S42.

The processing in accordance with the flowchart of FIG. 18 is summarized as follows. Discharging is started from a state in which the number P of parallel sections is n, the charging progresses, and when the electric storage unit voltage Vt reaches the preset second voltage value Lv (YES in step S43), series/parallel switching is performed, and the number P of parallel sections is decreased by one (step S45, S46). At the same time, voltage equalization by parallelization of adjacent capacitors is started (step S21, S22).

While discharging is continued, the operation for voltage equalization by parallelization of adjacent capacitors is repeated (step S43, S45, S46, S21, S22, S23), and each time the electric storage unit voltage Vt reaches the preset second voltage value Lv, series/parallel switching is performed, and the number P of parallel sections is decreased by one (step S43, S45, S46).

When the number P of parallel sections reaches 0 (i.e., when all capacitors are connected in series), voltage equalization by parallelization of adjacent capacitors is stopped, but discharging is continued (step S21, S48, S23).

Discharging further progresses in the state in which the number P of parallel sections is 0, and when the electric storage unit voltage Vt decreases and reaches the preset second voltage value Lv, discharging is stopped (step S43, S45, S47).

(Embodiment 3)

Figure 19:
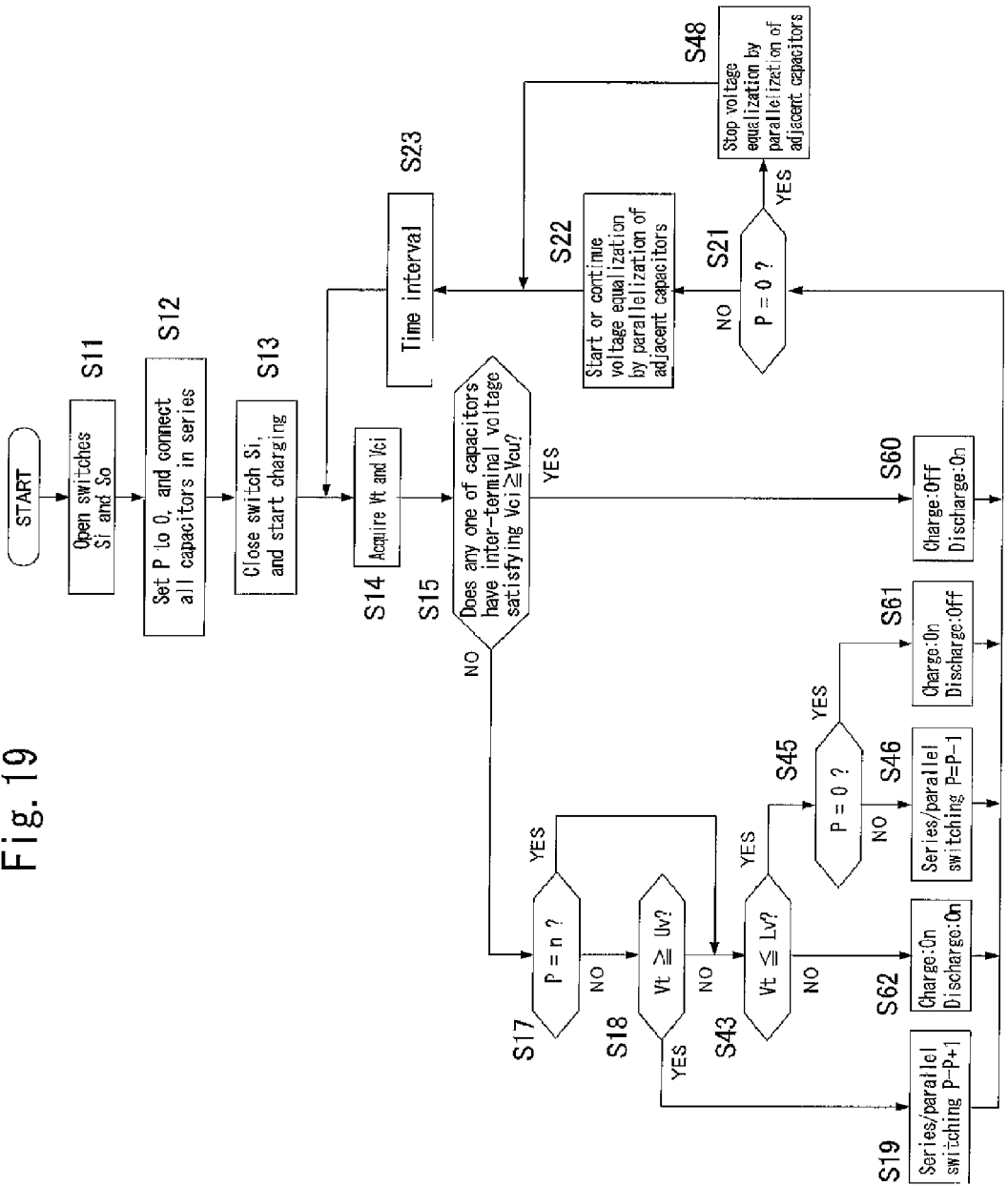
FIG. 19 is a flowchart for carrying out a combination of the charge control method and the discharge control method according to the present invention.

The present embodiment will discuss a combination of a charge control method and a discharge control method according to the present invention, or in other words, a case where discharging is performed while charging is performed. FIG. 19 is a flowchart for carrying out a combination of a charge control method and a discharge control method according to the present invention.

Note that FIG. 19 is a flowchart in the case where power for charge is larger than power for discharge. In the diagram, the same reference numerals are given to steps that are the same as those of FIGS. 17 and 18. Hereinafter, the flowchart of FIG. 19 will be described, focusing on steps that are different from the flowcharts of FIGS. 17 and 18.

Control is started from a state in which all capacitors Ci (i=1, 2, . . . , 2n) are in a fully discharged state, or in other words, a state in which the capacitors Ci are connected in series (the number P of parallel sections=0) (step S11, S12, S13). Then, the charge control (steps S14 to S23) described with reference to FIG. 17 is performed.

Charging is performed in a state in which all capacitors Ci are connected in series until the electric storage unit voltage Vt reaches the upper limit value Uv of the acceptable input voltage range of the power conversion device 3, and the processing for switching the connection state of the capacitors Ci (step S19) is not performed. Accordingly, the processing for voltage equalization by parallelization of adjacent capacitors (step S22) is not performed, either. Discharging is started when the electric storage unit voltage Vt exceeds the lower limit value Lv of the acceptable input voltage range of the power conversion device 3 (step S43, S62).

In FIG. 19, in the newly added steps S60 to S62, "Charge: On" means the operation of closing the switch Si or such a closed state being maintained. "Charge: Off" means the operation of opening the switch Si or such an open state being maintained. "Discharge: On" means the operation of closing the switch So or such a closed state being maintained. "Discharge: Off" means the operation of opening the switch So or such an open state being maintained.

Next is a description of control in the case where the electric storage unit is implemented with 2n capacitors, and an upper rated voltage and a lower rated voltage have been set for the inter-terminal voltage of the capacitors of the electric storage unit 21.

Figure 20:
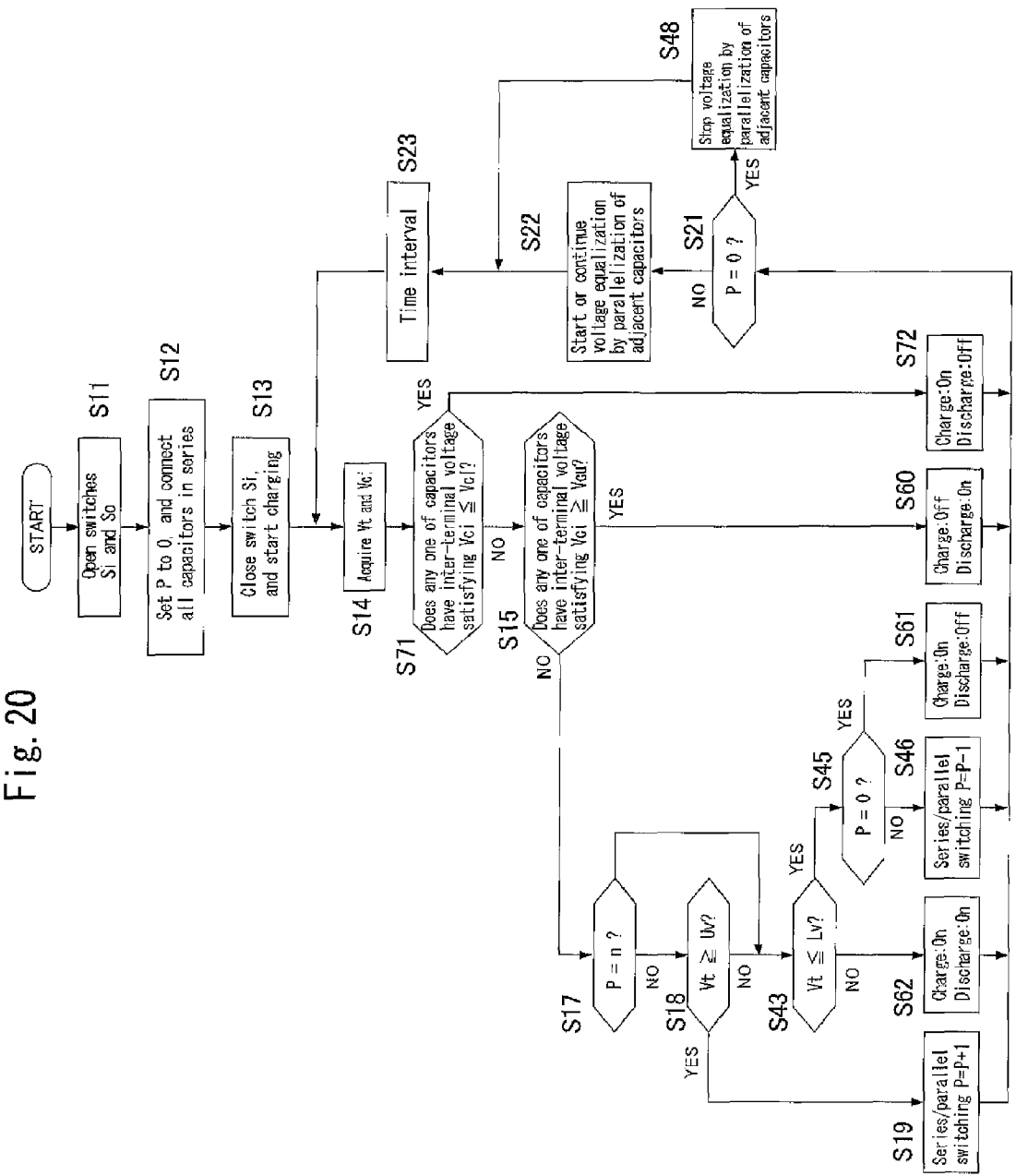
FIG. 20 is a flowchart for carrying out the charge control method and the discharge control method according to the present invention on an electric storage apparatus that uses capacitors in which an upper rated voltage and a lower rated voltage have been set.

FIG. 20 shows a flowchart in the case where capacitors Ci in which an upper rated voltage and a lower rated voltage have been set are used in an electric storage unit, and a charge control method and a discharge control method are combined, or in other words, in the case where discharging is performed while charging is performed. In the diagram, the upper rated voltage and the lower rated voltage of the inter-terminal voltage of the capacitors are respectively denoted by Vcu and Vcl.

In step S71, the control circuit 26 determines whether or not the inter-terminal voltage Vci of each capacitor Ci is less than or equal to the lower rated voltage Vcl. If the inter-terminal voltage Vci of any one of the capacitors Ci is less than or equal to the lower rated voltage Vcl (YES), control advances to the processing of step S72, where charging is turned on (i.e., the switch Si is closed) and at the same time, discharging is turned off (i.e., the switch So is opened). If, on the other hand, all capacitors Ci have an inter-terminal voltage Vci higher than the lower rated voltage Vc1 (NO), control advances to the processing of step S15.

Even in the case where the capacitors of the electric storage unit are implemented with 2n capacitors in which an upper rated voltage and a lower rated voltage have been set for the inter-terminal voltage, and a charge control method and a discharge control method are combined, charges are transferred from the capacitor having a large inter-terminal voltage to the capacitor having a small inter-terminal voltage by voltage equalization by parallelization of adjacent capacitors, and thus if an appropriate parallel connection time $\Delta T$ is selected, the inter-terminal voltages of all capacitors constituting the electric storage unit are maintained as substantially equal, excluding the case where all capacitors are connected in series.

<Comparison of Effects Between Control Method of the Present Invention and Conventional Control Method>

Figure 21A:
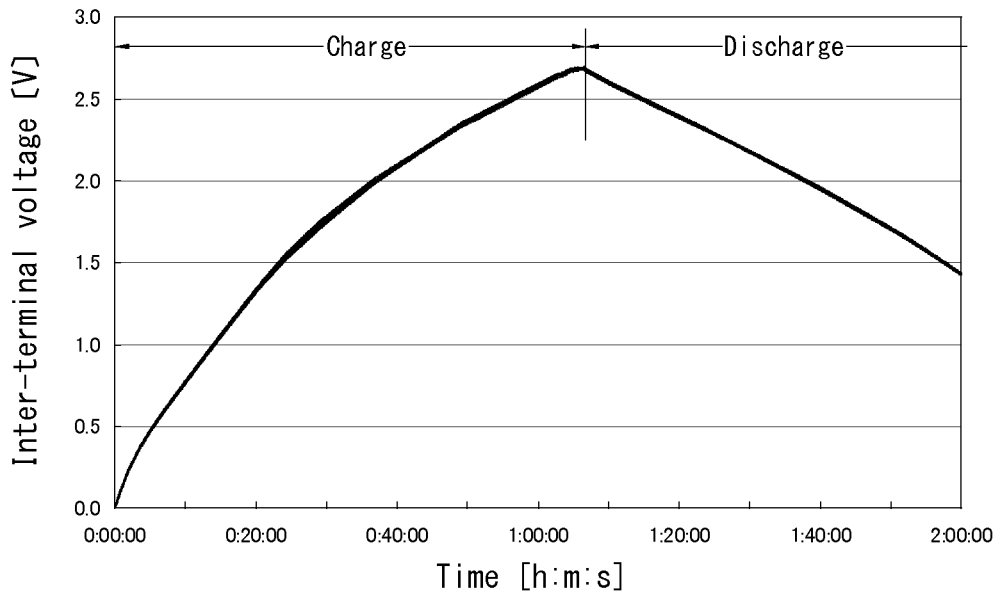
FIG. 21A and FIG. 21B show graphs showing temporal changes in the inter-terminal voltage of capacitors in the case where discharge control is performed after charge control has been performed by a method according to the present invention and in the case where discharge control is performed after charge control has been performed according to a conventional method.
Figure 21B:
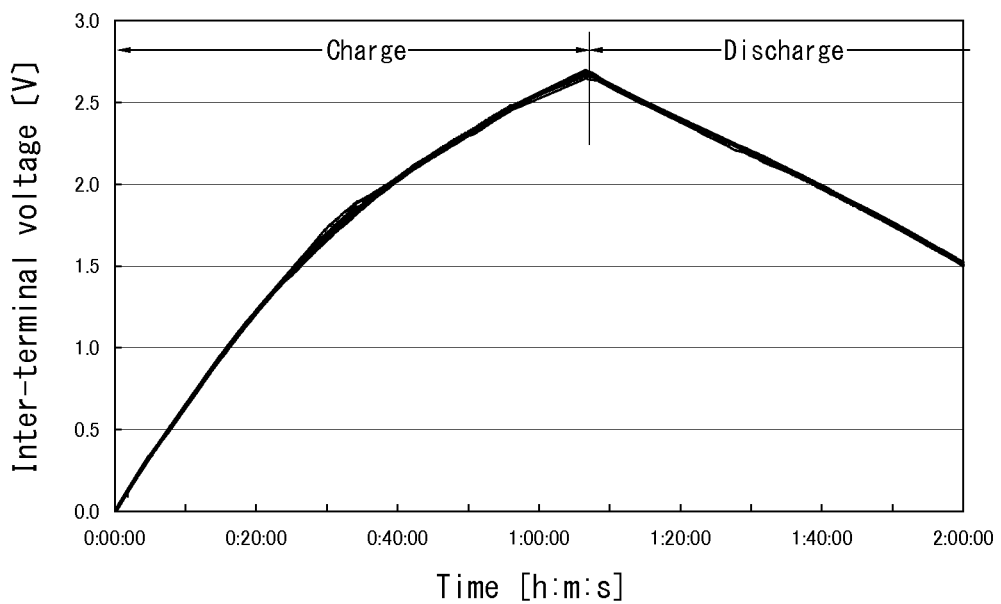

FIG. 21A shows temporal changes in the inter-terminal voltage Vci of the capacitors Ci in the case where charge control and discharge control were performed by the method of the present invention. Specifically, FIG. 21A is a graph showing temporal changes in the inter-terminal voltage Vci of the capacitors Ci in the case where an electric storage unit 21 was implemented by using 10 capacitors having a nominal electrostatic capacity of 1700 [F], charge control was performed in accordance with the flowchart shown in FIG. 17, and after all capacitors were fully charged, a load 4 was connected via a power conversion device 3 and discharge control was performed in accordance with the flowchart shown in FIG. 18. Likewise, FIG. 21B is a graph showing temporal changes in the inter-terminal voltage Vci of the capacitors Ci in the case where an electric storage unit having the same configuration as the method of the present invention was used, and charge control and discharge control were performed by the method of Patent Document 2.

Figure 22A:
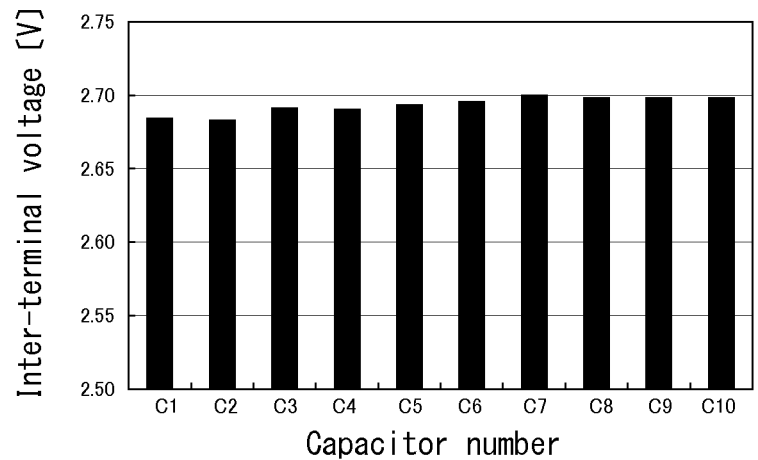
FIG. 22A and FIG. 22B show graphs showing the inter-terminal voltage of each capacitor obtained in a fully charged state as a result of charge control performed by a method according to the present invention and a method disclosed in Patent Document 2.
Figure 22B:
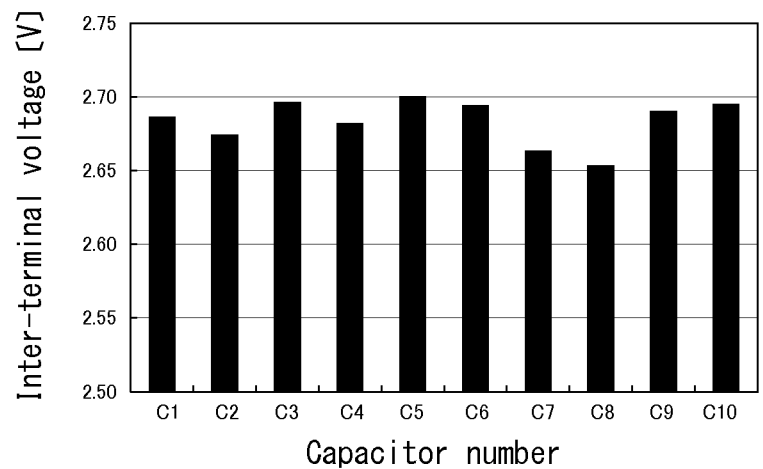
Figure 23:
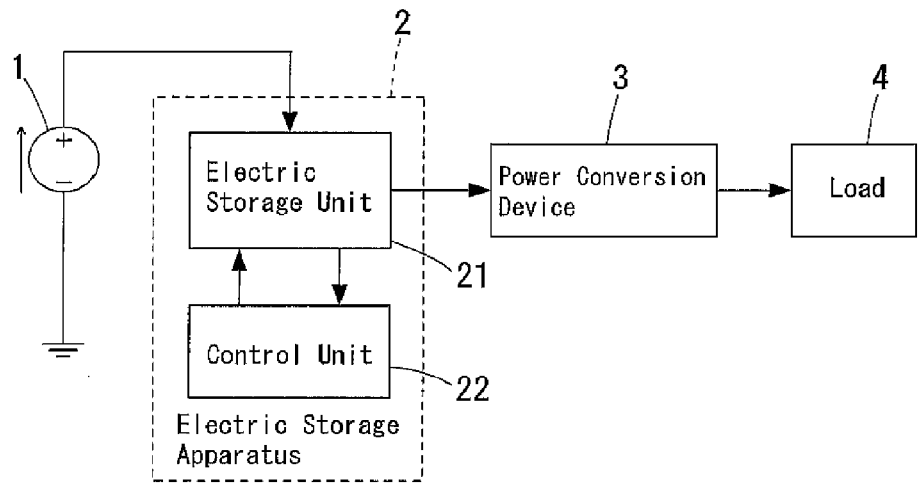
FIG. 23 is a block diagram showing a configuration of a power supply system in which a plurality of capacitors are used as an electric storage device.
Figure 24:
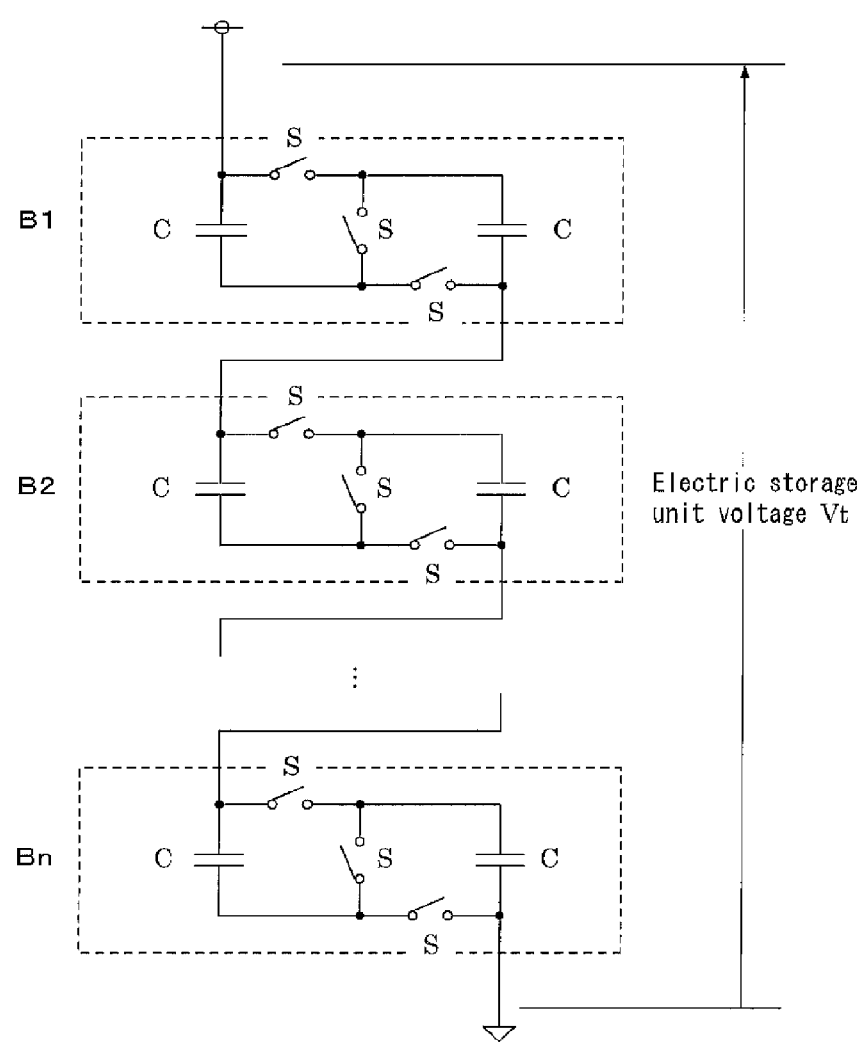
FIG. 24 is a circuit diagram showing an example of a configuration of an electric storage unit disclosed in Patent Document 1.
Figure 25:
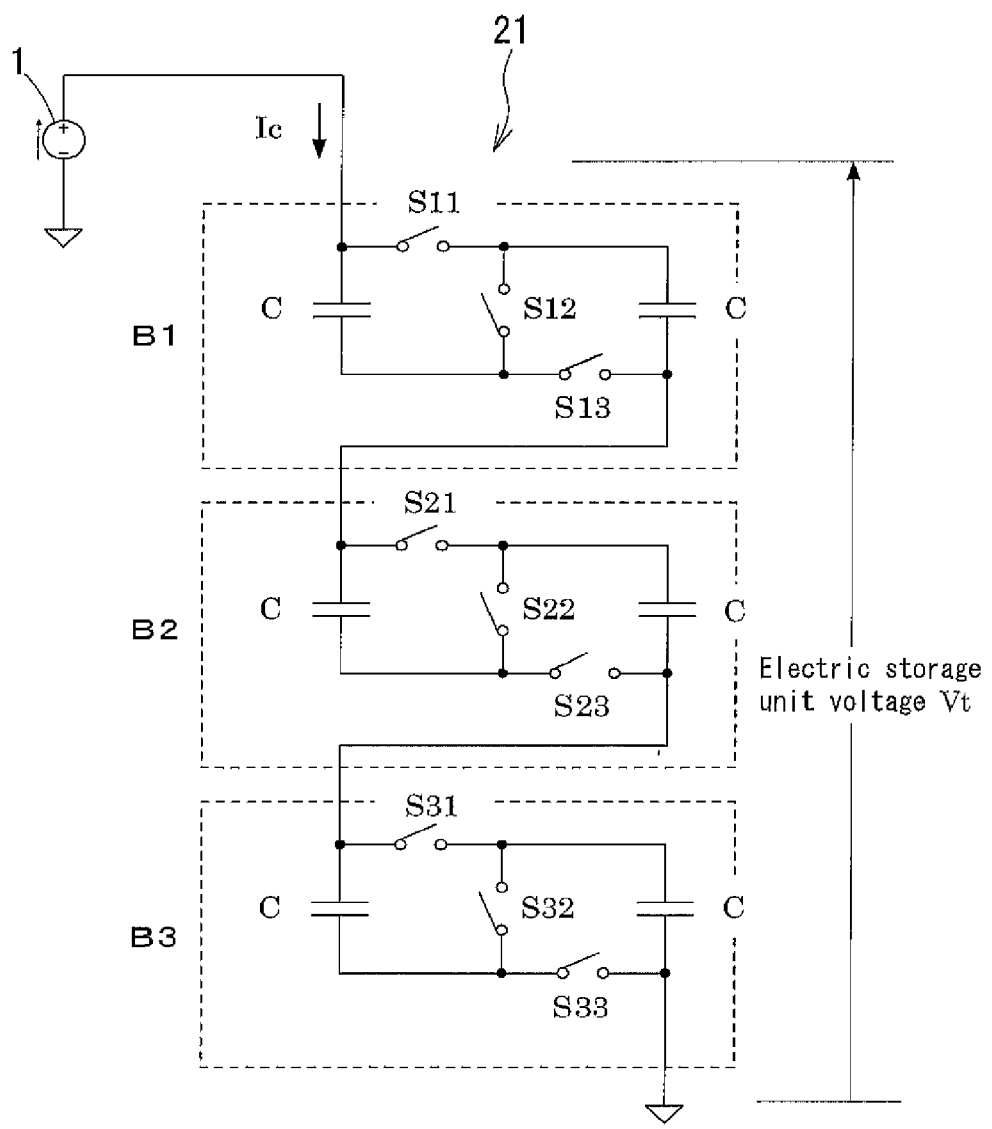
FIG. 25 is a circuit diagram of an electric storage unit including blocks in three stages disclosed in Patent Document 1.
Figures 30A, 30B, 30C, 30D:
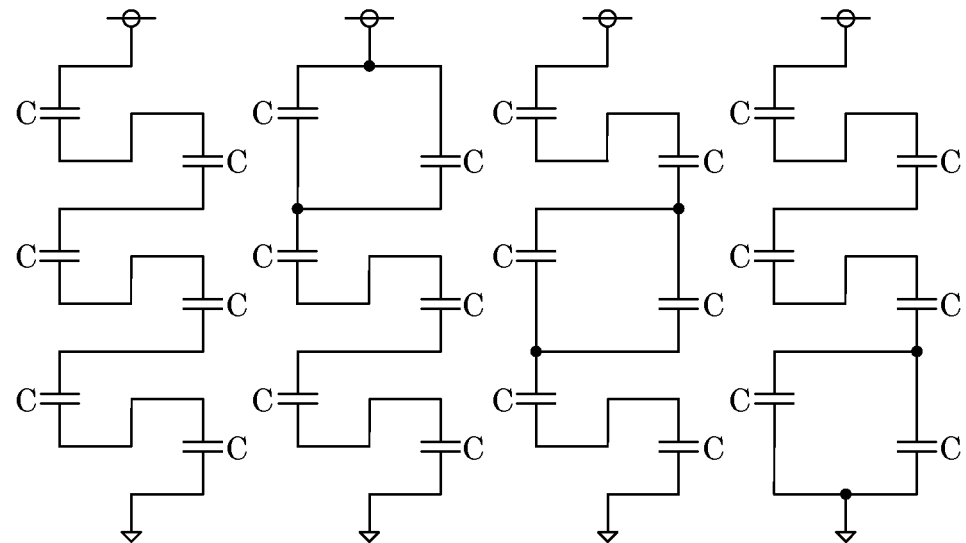
FIG. 30A, FIG. 30B, FIG. 30C, FIG. 30D, FIG. 30E, FIG. 30F, FIG. 30G and FIG. 30H show, in a simplified form, connection states of capacitors C constituting the electric storage unit shown in FIG. 29.
Figures 30E, 30F, 30G, 30H:
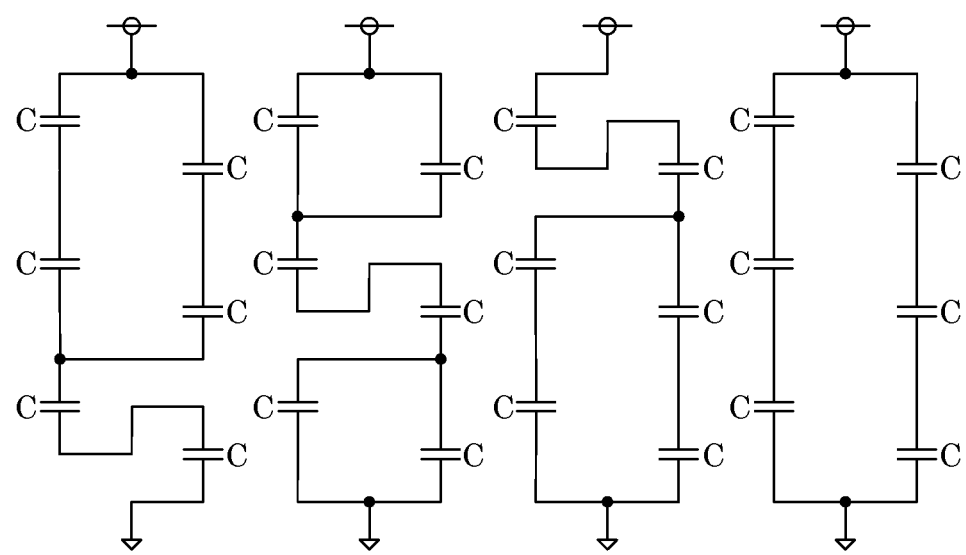

FIG. 22A shows the inter-terminal voltage Vci of each capacitor Ci obtained at the time when charging was stopped after charge control was performed by the method of the present invention (the capacitor has been fully charged), and FIG. 22B shows the inter-terminal voltage Vci of each capacitor Ci obtained at the time when the capacitor was fully charged after charge control was performed by the method of Patent Document 2.

With respect to the capacitors used here, only the upper rated voltage of the inter-terminal voltage was set to 2.7 [V], and the rated error range of the electrostatic capacity was 0 to +20%. The actually measured values of the electrostatic capacity of 10 capacitors are shown in Table 2.

TABLE 2

| Capacitor | Upper rated voltage [V] | Electrostatic capacity [F] | Electrostatic capacity error [%] | Internal resistance [mΩ] |
|---|---|---|---|---|
| C1 | 2.7 | 1825 | 7.3 | 0.40 |
| C2 | | 1920 | 12.9 | 0.42 |
| C3 | | 1846 | 8.6 | 0.42 |
| C4 | | 1837 | 8.1 | 0.42 |
| C5 | | 1819 | 7.0 | 0.40 |
| C6 | | 1837 | 8.1 | 0.41 |
| C7 | | 1832 | 7.8 | 0.40 |
| C8 | | 2034 | 19.6 | 0.40 |
| C9 | | 1832 | 7.8 | 0.40 |
| C10 | | 1830 | 7.6 | 0.40 |

The charge current was 2 [A], the discharge load was 8 [W], and the parallel connection time $\Delta T$ in voltage equalization by parallelization of adjacent capacitors was 10 [sec].

Accordingly, the time Tp for one cycle was 100 [sec]. Also, the acceptable input voltage range of the power conversion device (DC-AC inverter) 3 was 10.7 to 15.0 [V], but the conversion efficiency decreases near the upper or lower limit of the acceptable input voltage range, and thus the first voltage value Uv was set to 14.5 [V], and the second voltage value Lv was set to 11.5 [V]. Then, charging was started from a state in which all capacitors were in a fully discharged state, and after the capacitors became fully charged, discharging was performed.

It can be seen from FIG. 21A that, according to the control method of the present invention, even when a parallel monitor is not used, voltage is equalized without all capacitors exceeding an upper rated voltage of 2.7 [V] and being overcharged. Also, a comparison between FIG. 21A and FIG. 21B shows that the charge time, which is the duration from the start of charging to the time when fully charged, was substantially the same.

To be precise, the charge time in the case of the control method of the present invention was 1 hour 6 minutes 36 seconds, and the charge time in the case of the control method of Patent Document 2 was 1 hour 6 minutes 35 seconds. With the control method of the present invention, even in a state in which the capacitors of all blocks are connected in parallel (i.e., the state shown in FIG. 16), voltage equalization by parallelization of adjacent capacitors is performed, which requires time, but despite the fact that it takes some time to perform voltage equalization by parallelization of adjacent capacitors, the charge time was substantially the same.

The comparison between FIG. 21A and FIG. 21B also shows that the control method of the present invention exhibited less variation in inter-terminal voltage than the control method of Patent Document 2. This is even more manifested by a comparison between FIG. 21A and FIG. 21B showing variations in the inter-terminal voltage of each capacitor at the end of charging (when fully charged). The control method of the present invention exhibited less variation in the inter-terminal voltage of each capacitor at the end of charging (when fully charged) than the control method of Patent Document 2.

Specifically, with the control method of the present invention, the maximum difference value between the inter-terminal voltages of the capacitors when fully charged was 0.017 [V], whereas with the control method of Patent Document 2, the maximum difference value was 0.047 [V], from which the effectiveness of voltage equalization by parallelization of adjacent capacitors was confirmed.

As described earlier, the charging process ends at the time when one of the capacitors constituting the electric storage unit 21 reaches the rated voltage. Accordingly, at this time, if there is a large variation in the inter-terminal voltages of the capacitors, the amount of power not stored increases. In the above example, the amount of power not stored in the case of the control method of the present invention was 313.3 [J], whereas the amount of power not stored in the case of the control method of Patent Document 2 was 761.9 [J], from which it can be seen that the control method of the present invention is also effective in terms of charge efficiency.

Description of Symbols
1 Direct Current Power Source
2 Electric Storage Apparatus
3 Power Conversion Device
4 Load
21 Electric Storage Unit
22 Control Unit
23 Series/Parallel Switching Circuit
24 Inter-Terminal Voltage Detection Circuit 25 Electric Storage Unit Voltage Detection Circuit
26 Control Circuit
27 Pulse Generation Circuit
Ci (i=1, 2, . . . , 2n) Capacitor
S Switch

The invention claimed is:

1. A charge control method for an electric storage apparatus that uses, as an electric storage means, a group of capacitors that include 2n (where n is an integer of 2 or more) electric double layer capacitors, from first to 2n-th electric double layer capacitors, having an equal electrostatic capacity, and that is configured such that adjacent electric double layer capacitors can be connected either in series or in parallel by a switch and the 2n-th electric double layer capacitor and the first electric double layer capacitor can be connected in parallel by a switch, the charge control method comprising:

wherein where two electric double layer capacitors connected in parallel are defined as a parallel section, charging is started from a state in which all of the electric double layer capacitors are connected in series, and first processing and second processing are repeated until a number P of parallel sections reaches n, and an inter-terminal voltage of at least one of the 2n electric double layer capacitors reaches an upper rated voltage, the first processing includes: when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, and while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other electric double layer capacitors are caused to be in a series connection state, where when K is an integer, a $(2n+K)$th electric double layer capacitor is a Kth electric double layer capacitor, and the second processing includes: when a voltage of the electric storage means reaches a preset first voltage value, the number P of parallel sections is increased by one.

2. The charge control method for an electric storage apparatus according to claim 1, wherein as the first voltage value, an upper limit value of an acceptable input voltage range of a power conversion device connected to an output side of the electric storage means is used.

3. A discharge control method for an electric storage apparatus that uses, as an electric storage means, a group of capacitors that include 2n (where n is an integer of 2 or more) electric double layer capacitors, from first to 2n-th electric double layer capacitors, having an equal electrostatic capacity, and that is configured such that adjacent electric double layer capacitors can be connected either in series or in parallel by a switch and the 2n-th electric double layer capacitor and the first electric double layer capacitor can be connected in parallel by a switch, the discharge control method comprising:

wherein where two electric double layer capacitors connected in parallel are defined as a parallel section, first processing and second processing are repeated until the state is changed from a state in which a number P of parallel sections is n to a state in which all of the electric double layer capacitors are connected in series, and a voltage of the electric storage means reaches a preset second voltage value, the first processing includes: when the number P of parallel sections is 1 or greater, i is an integer whose value cycles from 1 to 2n, each value for $k_j$ (j is an integer that satisfies $1 \leq j \leq P$) is 0 or an even number satisfying $0 \leq k_j \leq 2n-2$, and while a value corresponding to i is increased by one every time a predetermined period of time passes, a connection state of an $(i+k_j)$th capacitor and an $(i+k_j+1)$th capacitor is switched to a parallel connection state so as to constitute the parallel section, and at the same time connection states of the other electric double layer capacitors are caused to be in a series connection state, where when K is an integer, a $(2n+K)$th electric double layer capacitor is a Kth electric double layer capacitor, and the second processing includes: when the voltage of the electric storage means reaches the second voltage value, the number P of parallel sections is decreased by one.

4. The discharge control method for an electric storage apparatus according to claim 3, wherein as the second voltage value, a lower limit value of an acceptable input voltage range of a power conversion device connected to an output side of the electric storage means is used.

5. The discharge control method for an electric storage apparatus according to claim 3, wherein in the case where capacitors in which a lower rated voltage has been set are used as the electric double layer capacitors, discharging is stopped when an inter-terminal voltage of any one of the electric double layer capacitors constituting the electric storage means falls below the lower rated voltage.

* * * * *